(12) United States Patent
Shim et al.

(10) Patent No.: US 12,143,884 B2
(45) Date of Patent: Nov. 12, 2024

(54) INFERENCE PIPELINE SYSTEM AND METHOD

(71) Applicant: FOURSQUARE LABS, INC., New York, NY (US)

(72) Inventors: David Shim, Seattle, WA (US); Brad Bicknell, Seattle, WA (US); George Varghese, Kirkland, WA (US); Nick Gerner, Seattle, WA (US); Weilie Yi, Bellevue, WA (US)

(73) Assignee: FOURESQUARE LABS, INC., New York, NY (US)

( * ) Notice: Subject to any disclaimer, the term of this patent is extended or adjusted under 35 U.S.C. 154(b) by 444 days.

(21) Appl. No.: 15/664,496

(22) Filed: Jul. 31, 2017

(65) Prior Publication Data

US 2017/0332205 A1  Nov. 16, 2017

Related U.S. Application Data

(63) Continuation of application No. 15/018,538, filed on Feb. 8, 2016, now Pat. No. 9,723,450, which is a continuation of application No. 14/300,102, filed on Jun. 9, 2014, now Pat. No. 9,256,832, which is a continuation of application No. 13/405,190, filed on Feb. 24, 2012, now Pat. No. 8,768,876.

(51) Int. Cl.
| | |
|---|---|
| *H04W 4/021* | (2018.01) |
| *G06N 5/04* | (2006.01) |
| *G06N 5/048* | (2023.01) |
| *H04W 4/029* | (2018.01) |

(52) U.S. Cl.
CPC .............. *H04W 4/021* (2013.01); *G06N 5/04* (2013.01); *G06N 5/048* (2013.01); *H04W 4/029* (2018.02)

(58) Field of Classification Search
USPC .......................................................... 706/12
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,975,690 | A | 12/1990 | Torres |
| 5,072,412 | A | 12/1991 | Henderson, Jr. et al. |
| 5,493,692 | A | 2/1996 | Theimer et al. |

(Continued)

FOREIGN PATENT DOCUMENTS

| | | |
|---|---|---|
| CA | 2887596 A1 | 7/2015 |
| EP | 2051480 A1 | 4/2009 |

(Continued)

OTHER PUBLICATIONS

Meneses F., Moreira A. (2009) Building a Personal Symbolic Space Model from GSM CellID Positioning Data. In: Bonnin JM., Giannelli C., Magedanz T. (eds) MOBILWARE 2009. Lecture Notes for ICSSITE vol. 7. Springer, Berlin, Heidelberg. https://doi.org/10.1007/978-3-642-01802-2_23 (Year: 2009).*

(Continued)

*Primary Examiner* — Van C Mang

(57) ABSTRACT

A system to infer place data is disclosed that receives location data collected on a user's mobile electronic device, recognizes when, where and for how long the user makes stops, generates possible places visited, and predicts the likelihood of a user to visit those places.

13 Claims, 8 Drawing Sheets

(56) References Cited

U.S. PATENT DOCUMENTS

| | | |
|---|---|---|
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,485 B1 | 9/2002 | Anzil |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,966,658 B2 | 6/2011 | Singh et al. |
| 8,001,204 B2 | 8/2011 | Burtner et al. |
| 8,010,685 B2 | 8/2011 | Singh et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads et al. |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,200,247 B1 | 6/2012 | Starenky et al. |
| 8,208,943 B2 | 6/2012 | Petersen |
| 8,214,443 B2 | 7/2012 | Hamburg |
| 8,219,032 B2 | 7/2012 | Behzad |
| 8,220,034 B2 | 7/2012 | Hahn et al. |
| 8,229,458 B2 | 7/2012 | Busch |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,296,842 B2 | 10/2012 | Singh et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,391,808 B2 | 3/2013 | Gonikberg et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,509,761 B2 | 8/2013 | Krinsky et al. |
| 8,510,383 B2 | 8/2013 | Hurley et al. |
| 8,527,345 B2 | 9/2013 | Rothschild et al. |
| 8,532,577 B2 | 9/2013 | Behzad et al. |
| 8,554,627 B2 | 10/2013 | Svendsen et al. |
| 8,560,612 B2 | 10/2013 | Kilmer et al. |
| 8,588,942 B2 | 11/2013 | Agrawal |
| 8,594,680 B2 | 11/2013 | Ledlie et al. |
| 8,613,088 B2 | 12/2013 | Varghese et al. |
| 8,613,089 B1 | 12/2013 | Holloway et al. |
| 8,660,358 B1 | 2/2014 | Bergboer et al. |
| 8,660,369 B2 | 2/2014 | Llano et al. |

(56) References Cited

U.S. PATENT DOCUMENTS

| | | | |
|---|---|---|---|
| 8,660,793 B2 | 2/2014 | Ngo et al. | |
| 8,682,350 B2 | 3/2014 | Altman et al. | |
| 8,718,333 B2 | 5/2014 | Wolf et al. | |
| 8,724,622 B2 | 5/2014 | Rojas | |
| 8,732,168 B2 | 5/2014 | Johnson | |
| 8,744,523 B2 | 6/2014 | Fan et al. | |
| 8,745,132 B2 | 6/2014 | Obradovich | |
| 8,751,427 B1* | 6/2014 | Mysen | H04L 67/306 706/46 |
| 8,761,800 B2 | 6/2014 | Kuwahara | |
| 8,768,876 B2* | 7/2014 | Shim | G06N 5/04 706/52 |
| 8,775,972 B2 | 7/2014 | Spiegel | |
| 8,788,680 B1 | 7/2014 | Naik | |
| 8,790,187 B2 | 7/2014 | Walker et al. | |
| 8,797,415 B2 | 8/2014 | Arnold | |
| 8,798,646 B1 | 8/2014 | Wang et al. | |
| 8,856,349 B2 | 10/2014 | Jain et al. | |
| 8,874,677 B2 | 10/2014 | Rosen et al. | |
| 8,886,227 B2 | 11/2014 | Schmidt et al. | |
| 8,909,679 B2 | 12/2014 | Roote et al. | |
| 8,909,725 B1 | 12/2014 | Sehn | |
| 8,942,953 B2 | 1/2015 | Yuen et al. | |
| 8,948,700 B2 | 2/2015 | Behzad et al. | |
| 8,972,357 B2* | 3/2015 | Shim | G06F 16/245 707/690 |
| 8,983,408 B2 | 3/2015 | Gonikberg et al. | |
| 8,995,433 B2 | 3/2015 | Rojas | |
| 9,015,285 B1 | 4/2015 | Ebsen et al. | |
| 9,020,745 B2 | 4/2015 | Johnston et al. | |
| 9,040,574 B2 | 5/2015 | Wang et al. | |
| 9,055,416 B2 | 6/2015 | Rosen et al. | |
| 9,083,708 B2 | 7/2015 | Ramjee et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,119,027 B2 | 8/2015 | Sharon et al. | |
| 9,123,074 B2 | 9/2015 | Jacobs | |
| 9,143,382 B2 | 9/2015 | Bhogal et al. | |
| 9,143,681 B1 | 9/2015 | Ebsen et al. | |
| 9,152,477 B1 | 10/2015 | Campbell et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,256,832 B2* | 2/2016 | Shim | G06N 5/04 |
| 9,258,459 B2 | 2/2016 | Hartley | |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,439,041 B2 | 9/2016 | Parvizi et al. | |
| 9,443,227 B2 | 9/2016 | Evans et al. | |
| 9,450,907 B2 | 9/2016 | Pridmore et al. | |
| 9,459,778 B2 | 10/2016 | Hogeg et al. | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,628,950 B1 | 4/2017 | Noeth et al. | |
| 9,710,821 B2 | 7/2017 | Heath | |
| 9,723,450 B2* | 8/2017 | Shim | G06N 5/04 |
| 9,854,219 B2 | 12/2017 | Sehn | |
| 2002/0047868 A1 | 4/2002 | Miyazawa | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0111467 A1 | 6/2004 | Willis | |
| 2004/0116134 A1* | 6/2004 | Maeda | H04B 7/1855 455/457 |
| 2004/0158739 A1 | 8/2004 | Wakai et al. | |
| 2004/0189465 A1 | 9/2004 | Capobianco et al. | |
| 2004/0203959 A1 | 10/2004 | Coombes | |
| 2004/0215625 A1 | 10/2004 | Svendsen et al. | |
| 2004/0243531 A1 | 12/2004 | Dean | |
| 2004/0243688 A1 | 12/2004 | Wugofski | |
| 2005/0021444 A1 | 1/2005 | Bauer et al. | |
| 2005/0022211 A1 | 1/2005 | Veselov et al. | |
| 2005/0048989 A1 | 3/2005 | Jung | |
| 2005/0078804 A1 | 4/2005 | Yomoda | |
| 2005/0097176 A1 | 5/2005 | Schatz et al. | |
| 2005/0102381 A1 | 5/2005 | Jiang et al. | |
| 2005/0104976 A1 | 5/2005 | Currans | |
| 2005/0114783 A1 | 5/2005 | Szeto | |
| 2005/0119936 A1 | 6/2005 | Buchanan et al. | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |
| 2005/0288954 A1 | 12/2005 | McCarthy et al. | |
| 2006/0026067 A1 | 2/2006 | Nicholas et al. | |
| 2006/0107297 A1 | 5/2006 | Toyama et al. | |
| 2006/0114338 A1 | 6/2006 | Rothschild | |
| 2006/0119882 A1 | 6/2006 | Harris et al. | |
| 2006/0242239 A1 | 10/2006 | Morishima et al. | |
| 2006/0252438 A1 | 11/2006 | Ansamaa et al. | |
| 2006/0265417 A1 | 11/2006 | Amato et al. | |
| 2006/0270419 A1 | 11/2006 | Crowley et al. | |
| 2006/0287878 A1 | 12/2006 | Wadhwa et al. | |
| 2007/0004426 A1 | 1/2007 | Pfleging et al. | |
| 2007/0038715 A1 | 2/2007 | Collins et al. | |
| 2007/0040931 A1 | 2/2007 | Nishizawa | |
| 2007/0073517 A1 | 3/2007 | Panje | |
| 2007/0073823 A1 | 3/2007 | Cohen et al. | |
| 2007/0075898 A1 | 4/2007 | Markhovsky et al. | |
| 2007/0082707 A1 | 4/2007 | Flynt et al. | |
| 2007/0136228 A1 | 6/2007 | Petersen | |
| 2007/0192128 A1 | 8/2007 | Celestini | |
| 2007/0198340 A1 | 8/2007 | Lucovsky et al. | |
| 2007/0198495 A1 | 8/2007 | Buron et al. | |
| 2007/0208751 A1 | 9/2007 | Cowan et al. | |
| 2007/0210936 A1 | 9/2007 | Nicholson | |
| 2007/0214180 A1 | 9/2007 | Crawford | |
| 2007/0214216 A1 | 9/2007 | Carrer et al. | |
| 2007/0233556 A1 | 10/2007 | Koningstein | |
| 2007/0233801 A1 | 10/2007 | Eren et al. | |
| 2007/0233859 A1 | 10/2007 | Zhao et al. | |
| 2007/0243887 A1 | 10/2007 | Bandhole et al. | |
| 2007/0244633 A1 | 10/2007 | Phillips et al. | |
| 2007/0244750 A1 | 10/2007 | Grannan et al. | |
| 2007/0255456 A1 | 11/2007 | Funayama | |
| 2007/0281690 A1 | 12/2007 | Altman et al. | |
| 2008/0022329 A1 | 1/2008 | Glad | |
| 2008/0025701 A1 | 1/2008 | Ikeda | |
| 2008/0032703 A1 | 2/2008 | Krumm et al. | |
| 2008/0033930 A1 | 2/2008 | Warren | |
| 2008/0043041 A2 | 2/2008 | Hedenstroem et al. | |
| 2008/0049704 A1 | 2/2008 | Witteman et al. | |
| 2008/0062141 A1 | 3/2008 | Chandhri | |
| 2008/0076505 A1 | 3/2008 | Nguyen et al. | |
| 2008/0092233 A1 | 4/2008 | Tian et al. | |
| 2008/0094387 A1 | 4/2008 | Chen | |

(56) References Cited

U.S. PATENT DOCUMENTS

| | | |
|---|---|---|
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0005987 A1* | 1/2009 | Vengroff ............... H04W 4/024 701/300 |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089558 A1 | 4/2009 | Bradford et al. |
| 2009/0089678 A1 | 4/2009 | Sacco et al. |
| 2009/0089710 A1 | 4/2009 | Wood et al. |
| 2009/0093261 A1 | 4/2009 | Ziskind et al. |
| 2009/0132341 A1 | 5/2009 | Klinger et al. |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis et al. |
| 2009/0192900 A1 | 7/2009 | Collison |
| 2009/0199242 A1 | 8/2009 | Johnson et al. |
| 2009/0204354 A1 | 8/2009 | Davis et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0276235 A1 | 11/2009 | Benezra et al. |
| 2009/0278738 A1 | 11/2009 | Gopinath |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0041378 A1 | 2/2010 | Aceves et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161720 A1 | 6/2010 | Colligan et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0211425 A1 | 8/2010 | Govindarajan |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0223346 A1 | 9/2010 | Dragt |
| 2010/0250109 A1 | 9/2010 | Johnston et al. |
| 2010/0257036 A1 | 10/2010 | Khojastepour et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0076653 A1 | 3/2011 | Culligan et al. |
| 2011/0083101 A1 | 4/2011 | Sharon et al. |
| 2011/0099046 A1 | 4/2011 | Weiss et al. |
| 2011/0099047 A1 | 4/2011 | Weiss |
| 2011/0099048 A1 | 4/2011 | Weiss et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215903 A1 | 9/2011 | Yang et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |

(56) References Cited

U.S. PATENT DOCUMENTS

| | | | |
|---|---|---|---|
| 2012/0100869 A1* | 4/2012 | Liang | H04W 4/02 455/456.1 |
| 2012/0108293 A1 | 5/2012 | Law et al. | |
| 2012/0110096 A1 | 5/2012 | Smarr et al. | |
| 2012/0113143 A1 | 5/2012 | Adhikari et al. | |
| 2012/0113272 A1 | 5/2012 | Hata | |
| 2012/0123830 A1 | 5/2012 | Svendsen et al. | |
| 2012/0123871 A1 | 5/2012 | Svendsen et al. | |
| 2012/0123875 A1 | 5/2012 | Svendsen et al. | |
| 2012/0124126 A1 | 5/2012 | Alcazar et al. | |
| 2012/0124176 A1 | 5/2012 | Curtis et al. | |
| 2012/0124458 A1 | 5/2012 | Cruzada | |
| 2012/0131507 A1 | 5/2012 | Sparandara et al. | |
| 2012/0131512 A1 | 5/2012 | Takeuchi et al. | |
| 2012/0143760 A1 | 6/2012 | Abulafia et al. | |
| 2012/0150978 A1 | 6/2012 | Monaco | |
| 2012/0165100 A1 | 6/2012 | Lalancette et al. | |
| 2012/0166971 A1 | 6/2012 | Sachson et al. | |
| 2012/0169855 A1 | 7/2012 | Oh | |
| 2012/0172062 A1 | 7/2012 | Altman et al. | |
| 2012/0173991 A1 | 7/2012 | Roberts et al. | |
| 2012/0176401 A1 | 7/2012 | Hayward et al. | |
| 2012/0184248 A1 | 7/2012 | Speede | |
| 2012/0197724 A1 | 8/2012 | Kendall | |
| 2012/0200743 A1 | 8/2012 | Blanchflower et al. | |
| 2012/0209924 A1 | 8/2012 | Evans et al. | |
| 2012/0210244 A1 | 8/2012 | De Francisco Lopez et al. | |
| 2012/0212632 A1 | 8/2012 | Mate et al. | |
| 2012/0220264 A1 | 8/2012 | Kawabata | |
| 2012/0226748 A1 | 9/2012 | Bosworth et al. | |
| 2012/0233000 A1 | 9/2012 | Fisher et al. | |
| 2012/0236162 A1 | 9/2012 | Imamura | |
| 2012/0239761 A1 | 9/2012 | Linner et al. | |
| 2012/0246004 A1 | 9/2012 | Book | |
| 2012/0250951 A1 | 10/2012 | Chen | |
| 2012/0252418 A1 | 10/2012 | Kandekar et al. | |
| 2012/0254325 A1 | 10/2012 | Majeti et al. | |
| 2012/0264446 A1 | 10/2012 | Xie et al. | |
| 2012/0278387 A1 | 11/2012 | Garcia et al. | |
| 2012/0278692 A1 | 11/2012 | Shi | |
| 2012/0290637 A1 | 11/2012 | Perantatos et al. | |
| 2012/0299954 A1 | 11/2012 | Wada et al. | |
| 2012/0304052 A1 | 11/2012 | Tanaka et al. | |
| 2012/0304080 A1 | 11/2012 | Wormald et al. | |
| 2012/0307096 A1 | 12/2012 | Bray et al. | |
| 2012/0307112 A1 | 12/2012 | Kunishige et al. | |
| 2012/0319904 A1 | 12/2012 | Lee et al. | |
| 2012/0323933 A1 | 12/2012 | He et al. | |
| 2012/0324018 A1 | 12/2012 | Metcalf et al. | |
| 2013/0006759 A1 | 1/2013 | Srivastava et al. | |
| 2013/0024757 A1 | 1/2013 | Doll et al. | |
| 2013/0036364 A1 | 2/2013 | Johnson | |
| 2013/0045753 A1 | 2/2013 | Obermeyer et al. | |
| 2013/0050260 A1 | 2/2013 | Reitan | |
| 2013/0055083 A1 | 2/2013 | Fino | |
| 2013/0057587 A1 | 3/2013 | Leonard et al. | |
| 2013/0059607 A1 | 3/2013 | Herz et al. | |
| 2013/0060690 A1 | 3/2013 | Oskolkov et al. | |
| 2013/0063369 A1 | 3/2013 | Malhotra et al. | |
| 2013/0067027 A1 | 3/2013 | Song et al. | |
| 2013/0071093 A1 | 3/2013 | Hanks et al. | |
| 2013/0080254 A1 | 3/2013 | Thramann | |
| 2013/0085790 A1 | 4/2013 | Palmer et al. | |
| 2013/0086072 A1 | 4/2013 | Peng et al. | |
| 2013/0090171 A1 | 4/2013 | Holton et al. | |
| 2013/0095857 A1 | 4/2013 | Garcia et al. | |
| 2013/0104053 A1 | 4/2013 | Thornton et al. | |
| 2013/0110885 A1 | 5/2013 | Brundrett, III | |
| 2013/0111514 A1 | 5/2013 | Slavin et al. | |
| 2013/0128059 A1 | 5/2013 | Kristensson | |
| 2013/0129252 A1 | 5/2013 | Lauper et al. | |
| 2013/0132477 A1 | 5/2013 | Bosworth et al. | |
| 2013/0145286 A1 | 6/2013 | Feng et al. | |
| 2013/0159110 A1 | 6/2013 | Rajaram et al. | |
| 2013/0159919 A1 | 6/2013 | Leydon | |
| 2013/0169822 A1 | 7/2013 | Zhu et al. | |
| 2013/0173729 A1 | 7/2013 | Starenky et al. | |
| 2013/0182133 A1 | 7/2013 | Tanabe | |
| 2013/0185131 A1 | 7/2013 | Sinha et al. | |
| 2013/0191198 A1 | 7/2013 | Carlson et al. | |
| 2013/0194301 A1 | 8/2013 | Robbins et al. | |
| 2013/0198176 A1 | 8/2013 | Kim | |
| 2013/0218965 A1 | 8/2013 | Abrol et al. | |
| 2013/0218968 A1 | 8/2013 | Mcevilly et al. | |
| 2013/0222323 A1 | 8/2013 | Mckenzie | |
| 2013/0225202 A1 | 8/2013 | Shim et al. | |
| 2013/0226857 A1 | 8/2013 | Shim et al. | |
| 2013/0227476 A1 | 8/2013 | Frey | |
| 2013/0232194 A1 | 9/2013 | Knapp et al. | |
| 2013/0254227 A1 | 9/2013 | Shim et al. | |
| 2013/0263031 A1 | 10/2013 | Oshiro et al. | |
| 2013/0265450 A1 | 10/2013 | Barnes, Jr. | |
| 2013/0267253 A1 | 10/2013 | Case et al. | |
| 2013/0275505 A1 | 10/2013 | Gauglitz et al. | |
| 2013/0290443 A1 | 10/2013 | Collins et al. | |
| 2013/0304646 A1 | 11/2013 | De Geer | |
| 2013/0311255 A1 | 11/2013 | Cummins et al. | |
| 2013/0325964 A1 | 12/2013 | Berberat | |
| 2013/0344896 A1 | 12/2013 | Kirmse et al. | |
| 2013/0346869 A1 | 12/2013 | Asver et al. | |
| 2013/0346877 A1 | 12/2013 | Borovoy et al. | |
| 2014/0006129 A1 | 1/2014 | Heath | |
| 2014/0011538 A1 | 1/2014 | Mulcahy et al. | |
| 2014/0019264 A1 | 1/2014 | Wachman et al. | |
| 2014/0032682 A1 | 1/2014 | Prado et al. | |
| 2014/0043204 A1 | 2/2014 | Basnayake et al. | |
| 2014/0045530 A1 | 2/2014 | Gordon et al. | |
| 2014/0047016 A1 | 2/2014 | Rao | |
| 2014/0047045 A1 | 2/2014 | Baldwin et al. | |
| 2014/0047335 A1 | 2/2014 | Lewis et al. | |
| 2014/0049652 A1 | 2/2014 | Moon et al. | |
| 2014/0052485 A1 | 2/2014 | Shidfar | |
| 2014/0052633 A1 | 2/2014 | Gandhi | |
| 2014/0057660 A1 | 2/2014 | Wager | |
| 2014/0082651 A1 | 3/2014 | Sharifi | |
| 2014/0092130 A1 | 4/2014 | Anderson et al. | |
| 2014/0096029 A1 | 4/2014 | Schultz | |
| 2014/0114565 A1 | 4/2014 | Aziz et al. | |
| 2014/0122658 A1 | 5/2014 | Haeger et al. | |
| 2014/0122787 A1 | 5/2014 | Shalvi et al. | |
| 2014/0129953 A1 | 5/2014 | Spiegel | |
| 2014/0143143 A1 | 5/2014 | Fasoli et al. | |
| 2014/0149519 A1 | 5/2014 | Redfern et al. | |
| 2014/0155102 A1 | 6/2014 | Cooper et al. | |
| 2014/0173424 A1 | 6/2014 | Hogeg et al. | |
| 2014/0173457 A1 | 6/2014 | Wang et al. | |
| 2014/0189592 A1 | 7/2014 | Benchenaa et al. | |
| 2014/0207679 A1 | 7/2014 | Cho | |
| 2014/0214471 A1 | 7/2014 | Schreiner, III | |
| 2014/0222564 A1 | 8/2014 | Kranendonk et al. | |
| 2014/0258405 A1 | 9/2014 | Perkin | |
| 2014/0265359 A1 | 9/2014 | Cheng et al. | |
| 2014/0266703 A1 | 9/2014 | Dalley, Jr. et al. | |
| 2014/0279061 A1 | 9/2014 | Elimeliah et al. | |
| 2014/0279436 A1 | 9/2014 | Dorsey et al. | |
| 2014/0279540 A1 | 9/2014 | Jackson | |
| 2014/0280537 A1 | 9/2014 | Pridmore et al. | |
| 2014/0282096 A1 | 9/2014 | Rubinstein et al. | |
| 2014/0287779 A1 | 9/2014 | O'keefe et al. | |
| 2014/0289833 A1 | 9/2014 | Briceno | |
| 2014/0306986 A1 | 10/2014 | Gottesman et al. | |
| 2014/0317302 A1 | 10/2014 | Naik | |
| 2014/0324627 A1 | 10/2014 | Haver et al. | |
| 2014/0324629 A1 | 10/2014 | Jacobs | |
| 2014/0325383 A1 | 10/2014 | Brown et al. | |
| 2015/0020086 A1 | 1/2015 | Chen et al. | |
| 2015/0046278 A1 | 2/2015 | Pei et al. | |
| 2015/0071619 A1 | 3/2015 | Brough | |
| 2015/0087263 A1 | 3/2015 | Branscomb et al. | |
| 2015/0088622 A1 | 3/2015 | Ganschow et al. | |
| 2015/0095020 A1 | 4/2015 | Leydon | |
| 2015/0096042 A1 | 4/2015 | Mizrachi | |
| 2015/0116529 A1 | 4/2015 | Wu et al. | |
| 2015/0169827 A1 | 6/2015 | Laborde | |

(56) References Cited

U.S. PATENT DOCUMENTS

| | | | |
|---|---|---|---|
| 2015/0172534 | A1 | 6/2015 | Miyakawa et al. |
| 2015/0178260 | A1 | 6/2015 | Brunson |
| 2015/0222814 | A1 | 8/2015 | Li et al. |
| 2015/0261917 | A1 | 9/2015 | Smith |
| 2015/0312184 | A1 | 10/2015 | Langholz et al. |
| 2015/0350136 | A1 | 12/2015 | Flynn, III et al. |
| 2015/0365795 | A1 | 12/2015 | Allen et al. |
| 2015/0378502 | A1 | 12/2015 | Hu et al. |
| 2016/0006927 | A1 | 1/2016 | Sehn |
| 2016/0014063 | A1 | 1/2016 | Hogeg et al. |
| 2016/0085773 | A1 | 3/2016 | Chang et al. |
| 2016/0085863 | A1 | 3/2016 | Allen et al. |
| 2016/0099901 | A1 | 4/2016 | Allen et al. |
| 2016/0180887 | A1 | 6/2016 | Sehn |
| 2016/0182422 | A1 | 6/2016 | Sehn et al. |
| 2016/0182875 | A1 | 6/2016 | Sehn |
| 2016/0232571 | A1* | 8/2016 | Moshfeghi ............. G06Q 30/02 |
| 2016/0239248 | A1 | 8/2016 | Sehn |
| 2016/0277419 | A1 | 9/2016 | Allen et al. |
| 2016/0321708 | A1 | 11/2016 | Sehn |
| 2017/0006094 | A1 | 1/2017 | Abou Mahmoud et al. |
| 2017/0061308 | A1 | 3/2017 | Chen et al. |
| 2017/0287006 | A1 | 10/2017 | Azmoodeh et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

John Calfee, Clifford Winston, Randolph Stempski; Econometric Issues in Estimating Consumer Preferences from Stated Preference Data: A Case Study of the Value of Automobile Travel Time. The Review of Economics and Statistics 2001; 83 (4): 699-707. doi: https://doi.org/10.1162/003465301753237777 (Year: 2001).*

Kohei Tanaka, Yasue Kishino, Tsutomu Terada, and Shojiro Nishio. 2009. A destination prediction method using driving contexts and trajectory for car navigation systems.SAC '09. Association for Computing Machinery, New York, NY, USA, 190-195. DOI:https://doi.org/10.1145/1529282.1529323 (Year: 2009).*

Froehlich, Jon et al. "Route Prediction from Trip Observations" University of Washington [Published 2008] [Retrieved Jun. 2021] <URL: https://makeabilitylab.cs.washington.edu/media/publications/Route_Prediction_from_Trip_Observations_p1hrOb7.pdf> (Year: 2008).*

Andrew Kirmse, Tushar Udeshi, Pablo Bellver, and Jim Shuma. 2011. Extracting patterns from location history. In <i>Proceedings of the 19th ACM Sigspatialgis . Association for Computing Machinery, New York, NY, USA, DOI:https://doi.org/10.1145/2093973.2094032 (Year: 2011).*

Jong Hee Kang, William Welbourne, Benjamin Stewart, and Gaetano Borriello. 2005. Extracting places from traces of locations. <i>SIGMOBILE Mob. Comput. Commun. Rev .</i> 9, 3 (Jul. 2005), 58-68. DOI:https://doi.org/10.1145/1094549.1094558 (Year: 2005).*

Ling Chen, Mingqi Lv, Gencai Chen, A system for destination and future route prediction based on trajectory mining, ISSN 1574-1192,https://doi.org/10.1016/j.pmcj.2010.08.004.https://www.sciencedirect.com/science/article/pii/S1574119210000805) (Year: 2010).*

Chang, J., & Sun, E. (2011). Location3: How users share and respond to location-based data on social. In Proceedings of the International AAAI Conference on Web and Social Media (vol. 5, No. 1, pp. 74-80). (Year: 2011).*

"A Whole New Story", Snap, Inc., URL: https://www.snap.com/en-US/news/, (2017), 13 pgs.

"Adding photos to your listing", eBay, URL: http://pages.ebay.com/help/sell/pictures.html, (accessed May 24, 2017), 4 pgs.

"BlogStomp", StompSoftware, URL: http://stompsoftware.com/blogstomp, (accessed May 24, 2017), 12 pgs.

"Cup Magic Starbucks Holiday Red Cups come to life with AR app", Blast Radius, URL: http://www.blastradius.com/work/cup-magic, (2016), 7 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell the Whole Story", URL: https://youtu.be/uF_gFkg1hBM, (Nov. 8, 2013), 113 pgs.

"International Application No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Macy's Believe-o-Magic", URL: https://www.youtube.com/watch?v=xvzRXy3J0Z0, (Nov. 7, 2011), 102 pgs.

"Macys Introduces Augmented Reality Experience in Stores across Country as Part of Its 2011 Believe Campaign", Business Wire, URL: https://www.businesswire.com/news/home/20111102006759/en/Macys-Introduces-Augmented-Reality-Experience-Stores-Country, (Nov. 2, 2011), 6 pgs.

"Starbucks Cup Magic", URL: https://www.youtube.com/watch?v=RWwQXi9RG0w, (Nov. 8, 2011), 87 pgs.

"Starbucks Cup Magic for Valentine's Day", URL: https://www.youtube.com/watch?v=8nvq0zjq10w, (Feb. 6, 2012), 88 pgs.

"Starbucks Holiday Red Cups Come to Life, Signaling the Return of the Merriest Season", Business Wire, URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobli Just Won Filters", URL: https://techcrunch.com/2011/09/08/mobli-filters, (Sep. 8, 2011), 10 pgs.

Janthong, Isaranu, "Instaplace ready on Android Google Play store", Android App Review Thailand, URL: http://www.android-free-app-review.com/2013/01/instaplace-android-google-play-store.html, (Jan. 23, 2013), 9 pgs.

Macleod, Duncan, "Macys Believe-o-Magic App", URL: http://theinspirationroom.com/daily/2011/macys-believe-o-magic-app, (Nov. 14, 2011), 10 pgs.

Macleod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide to the New Snapchat Filters and Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.

Panzarino, Matthew, "Snapchat Adds Filters, A Replay Function and for Whatever Reason, Time, Temperature and Speed Overlays", URL: https://techcrunch.com/2013/12/20/snapchat-adds-filters-new-font-and-for-some-reason-time-temperature-and-speed-overlays/, (Dec. 20, 2013), 12 pgs.

(56) References Cited

OTHER PUBLICATIONS

Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.
"U.S. Appl. No. 13/405,190, 312 Amendment filed May 9, 2014", 10 pgs.
"U.S. Appl. No. 13/405,190, Non Final Office Action dated Feb. 25, 2014", 8 pgs.
"U.S. Appl. No. 13/405,190, Notice of Allowance dated Apr. 23, 2014", 11 pgs.
"U.S. Appl. No. 13/405,190, Preliminary Amendment filed Sep. 7, 2012", 3 pgs.
"U.S. Appl. No. 13/405,190, Response filed Mar. 27, 2014 to Non Final Office Action dated Feb. 25, 2014", 11 pgs.
"U.S. Appl. No. 14/300,102, Non Final Office Action dated Apr. 7, 2015", 14 pgs.
"U.S. Appl. No. 14/300,102, Non Final Office Action dated Dec. 4, 2014", 14 pgs.
"U.S. Appl. No. 14/300,102, Notice of Allowance dated Oct. 19, 2015", 6 pgs.
"U.S. Appl. No. 14/300,102, Preliminary Amendment filed Jun. 27, 2014", 9 pgs.
"U.S. Appl. No. 14/300,102, Response filed Mar. 4, 2015 to Non Final Office Action dated Dec. 4, 2014", 10 pgs.
"U.S. Appl. No. 14/300,102, Response filed Oct. 7, 2015 to Non Final Office Action dated Apr. 7, 2015", 10 pgs.
"U.S. Appl. No. 15/018,538, Final Office Action dated Dec. 1, 2016", 8 pgs.
"U.S. Appl. No. 15/018,538, Non Final Office Action dated Jul. 14, 2016", 13 pgs.
"U.S. Appl. No. 15/018,538, Notice of Allowance dated Mar. 24, 2017", 6 pgs.
"U.S. Appl. No. 15/018,538, Response filed Mar. 1, 2017 to Final Office Action dated Dec. 1, 2016", 10 pgs.
"U.S. Appl. No. 15/018,538, Response filed Oct. 14, 2016 to Non Final Office Action dated Jul. 14, 2016", 9 pgs.
Chen, Ruizhi, et al., "Development of a contextual thinking engine in mobile devices", Ubiquitous Positioning Indoor Navigation and Location Based Service (UPINLBS), (2014), 90-96.
Dashti, Marzieh, et al., "Detecting co-located mobile users", IEEE International Conference on Communications (ICC) Year, (2015), 1565-1570.
Gregorich, et al., "Verification of AIRS boresight Accuracy Using Coastline Detection", IEEE Transactions on Geoscience and Remote Sensing, IEEE Transactions on Year: 2003, vol. 41, Issue: 2, DOI: 10.11 09/TGRS.2002.808311 Referenced in: IEEE Journals & Magazines, (2003), 1-5.
Kun, Hsu-Yang, et al., "Using RFID Technology and SOA with 4D Escape Route", Wireless Communications, Networking and Mobile Computing, WiCOM '08. 4th International Conference on Year: 2008 DOI: 10.11 09/WiCom.2008.3030 Referenced in: IEEE Conference Publications, (2008), 1-4.
Mostafa, Elhamshary, et al., "A Fine-grained Indoor Location-based Social Network", IEEE Transactions on Mobile Computing, vol. PP, Issue: 99, (2016), 12 pgs.
Roth, John D, et al., "On mobile positioning via Cellular Synchronization Assisted Refinement (CeSAR) in L TE and GSM networks", 9th International Conference on Signal Processing and Communication Systems (ICSPCS), (2015).
Xia, Ning, et al., "GeoEcho: Inferring User Interests from Geotag Reports in Network Traffic", Web Intelligence (WI) and Intelligent Agent Technologies (IAT), IEEE/WIC/ACM International Joint Conferences, vol. 2 DOI: 10.1109/WI-IAT.2014.73 Referenced in: IEEE Conference Publications, (2014), 1-8.

\* cited by examiner

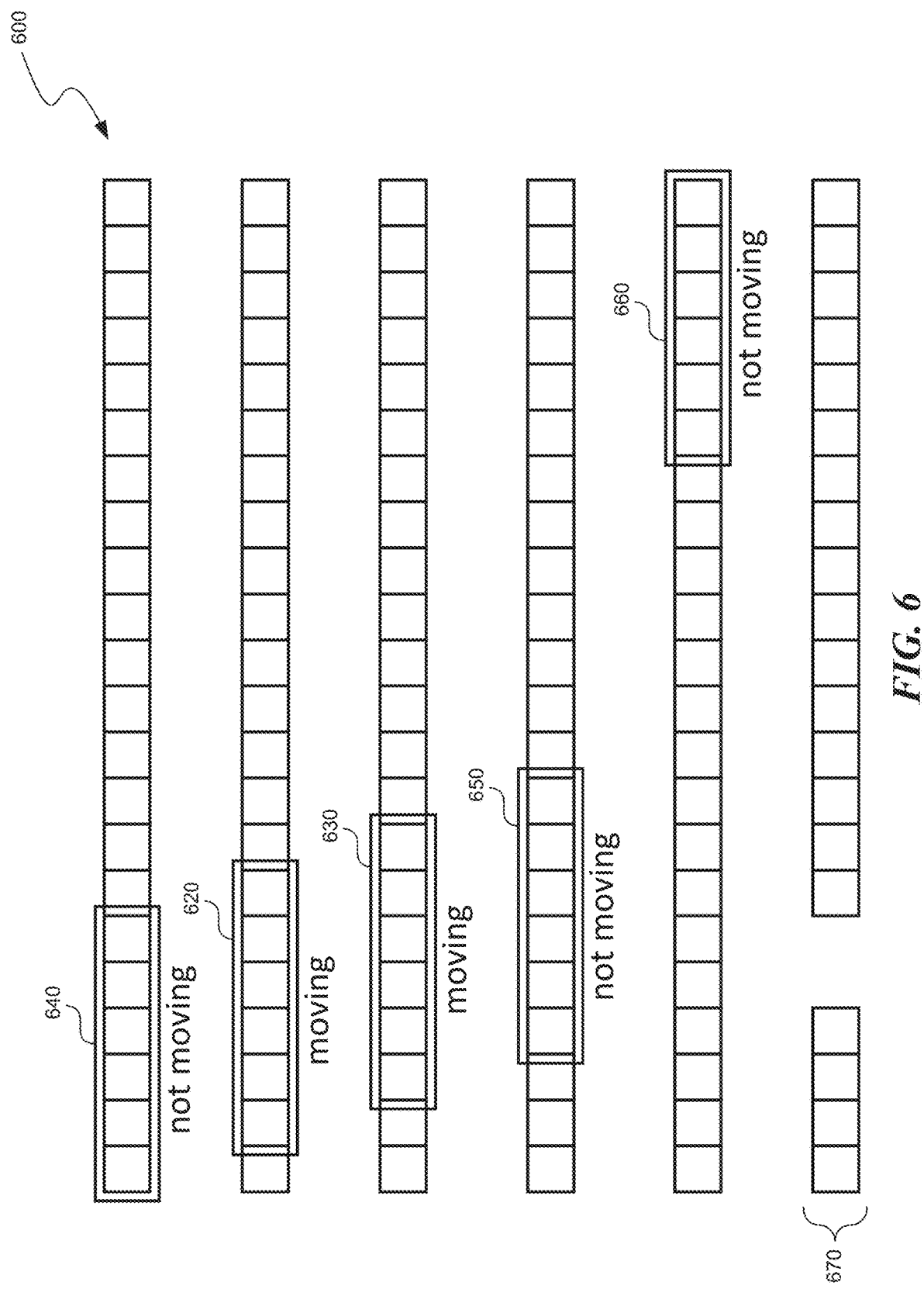

INFERENCE PIPELINE SYSTEM AND METHOD

CROSS-REFERENCE TO RELATED APPLICATION

This application is a continuation of U.S. patent application Ser. No. 15/018,538, filed Feb. 8, 2016, now U.S. Pat. No. 9,723,450, granted Aug. 1, 2017, which is a continuation of U.S. patent application Ser. No. 14/300,102, filed Jun. 9, 2014, now U.S. Pat. No. 9,256,832, granted Feb. 9, 2016, which is a continuation of U.S. patent application Ser. No. 13/405,190, filed Feb. 24, 2012, now U.S. Pat. No. 8,768,876, granted Jul. 1, 2014, all of which are incorporated by reference in their entirety.

BACKGROUND

There are a variety of existing technologies which track and monitor location data. One example is a Global Positioning Satellite (GPS) system which captures location information at regular intervals from earth-orbiting satellites. Another example is a radio frequency identification (RFID) system which identifies and tracks the location of assets and inventory by affixing a small microchip or tag to an object or person being tracked. Tracking of individuals, devices and goods may be performed using WiFi (IEEE 802.11), cellular wireless (2G, 3G, 4G, etc.) and other WLAN, WAN and other wireless communications technologies.

Additional technologies exist which use geographical positioning to provide information or entertainment services based on a user's location. In one example, an individual uses a mobile device to identify the nearest ATM or restaurant based on his or her current location. Another example is the delivery of targeted advertising or promotions to individuals whom are near a particular eating or retail establishment.

In existing systems, received information, such as both user data and place data are noisy. User location data can be noisy due to poor GPS reception, poor Wi-Fi reception, or weak cell phone signals. Similarly, mobile electronic devices can lack certain types of sensors or have low quality sensor readings. In the same way, the absence of a comprehensive database of places with sufficient coverage and accurate location information causes place data to also be noisy.

The need exists for a method that utilizes location data to accurately identify the location of people, objects, goods, etc., as well as provide additional benefits. Overall, the examples herein of some prior or related systems and their associated limitations are intended to be illustrative and not exclusive. Other limitations of existing or prior systems will be become apparent to those skilled in the art upon reading the following Detailed Description.

BRIEF DESCRIPTION OF THE DRAWINGS

The details of one or more implementations are set forth in the accompanying drawings and the description below. Further features of the invention, its nature and various advantages, will be apparent from the following detailed description and drawings, and from the claims.

Examples of a system and method for a data collection system are illustrated in the figures. The examples and figures are illustrative rather than limiting.

FIG. 6 depicts a location trace based method of detecting movement.

DETAILED DESCRIPTION

Figure 1:
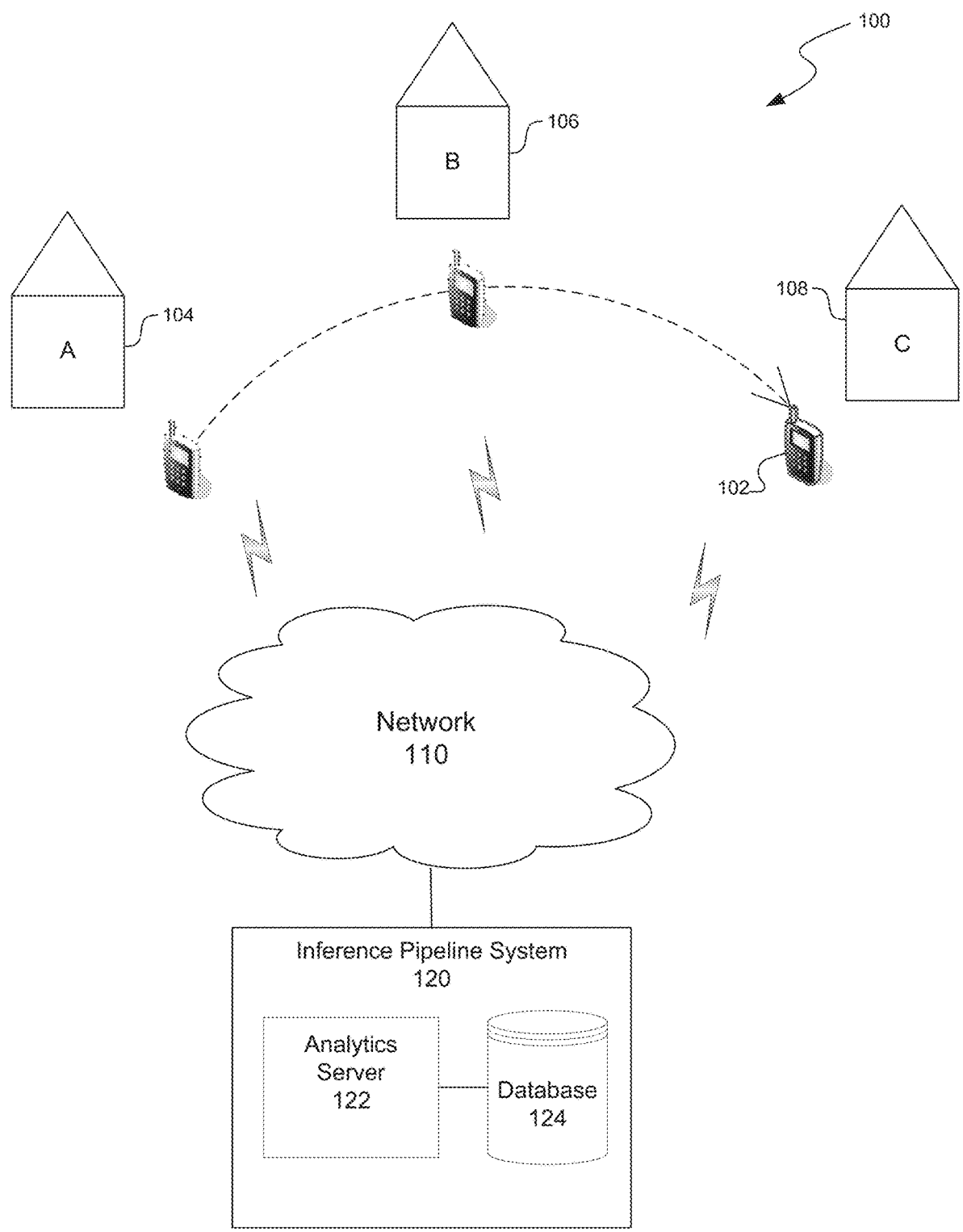
FIG. 1 depicts an example of an inference pipeline system and an environment in which one embodiment of the inference pipeline system can operate.

An inference pipeline system and method which incorporates validated location data into inference models is described herein. Given a user's information collected from a mobile electronic device, the inference pipeline recognizes whether a user visited a place, and if so, the probability of the user at a place, and how much time the user spent at the place. It also produces user location profiles, which include information about familiar routes and places.

In some cases, the inference pipeline systems and methods are part of a larger platform for identifying and monitoring a user's location. For example, the inference pipeline system can be coupled to a data collection system which collects and validates location data from a mobile device. Collected user information includes location data such as latitude, longitude, or altitude determinations, sensor data from, for example, compass/bearing data, accelerometer or gyroscope measurements, and other information that can be used to help identify a user's location and activity. Additional details of the data collection system can be found in U.S. patent application Ser. No. 13/405,182.

A place includes any physical establishment such as a restaurant, a park, a grocery store, or a gas station. Places can share the same name. For example, a Starbucks café in one block and a Starbucks café in a different block are separate places. Places can also share the same address. For example, a book store and the coffee shop inside are separate places. Each place can have attributes which include street address, category, hours of operation, customer reviews, popularity, and other information.

In one embodiment, the inference pipeline recognizes when a user visits a place based on location and sensor data. As an example, the inference pipeline system recognizes when a user makes a stop. Next, the place where the user has stopped can be predicted by searching various data sources, combining signals such as place attributes, collecting data from a mobile electronic device, harvesting user demographic and user profile information, monitoring external factors such as season, weather, and events, and using an inference model to generate the probabilities of a user visiting a place.

In another embodiment, the inference pipeline combines various signals to rank all the possible places a user could be visiting. In another embodiment, the inference pipeline estimates the probability of a user visiting a place and the time user has spent at a place.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment 100 in which an inference pipeline system 120 can operate. A user device 102 is shown which moves from one location to another. As an example, user device 102 moves from a location A 104 to location B 106 to location C 108. The user device 102 may be any suitable device for sending and receiving communications and may represent various electronic systems, such as personal computers, laptop computers, tablet computers, mobile phones, mobile gaming devices, or the like. Those skilled in the relevant art will appreciate that aspects of the invention can be practiced with other communications, data processing, or computer system configurations, including: Internet appliances, hand-held devices [including personal digital assistants (PDAs)], wearable computers, all manner of cellular or mobile phones [including Voice over IP (VoIP) phones], dumb terminals, media players, gaming devices, multi-processor systems, microprocessor-based or programmable consumer electronics, and the like.

As the user device 102 changes locations, the inference pipeline system 120 receives location information through a communication network 110. Network 110 is capable of providing wireless communications using any suitable short-range or long-range communications protocol (e.g., a wireless communications infrastructure including communications towers and telecommunications servers). In other embodiments, network 110 may support Wi-Fi (e.g., 802.11 protocol), Bluetooth, high-frequency systems (e.g., 2G/3G/4G, 900 MHz, 2.4 GHz, and 5.6 GHz communication systems), infrared, or other relatively localized wireless communication protocol, or any combination thereof. As such, any suitable circuitry, device, and/or system operative to create a communications network may be used to create network 110. In some embodiments, network 110 supports protocols used by wireless and cellular phones. Such protocols may include, for example, GSM, GSM plus EDGE, CDMA, quad-band, and other cellular protocols. Network 110 also supports long range communication protocols (e.g., Wi-Fi) and protocols for placing and receiving calls using VoIP or LAN.

As will be described in additional detail herein, the inference pipeline system 120 comprises of an analytics server 122 coupled to a database 124. Indeed, the terms "system," "platform," "server," "host," "infrastructure," and the like are generally used interchangeably herein, and may refer to any computing device or system or any data processor.

1. INPUT/OUTPUT

This section describes inputs and outputs of the inference pipeline.

1.1 Input

The input to the inference pipeline is a sequence of location and/or sensor readings that have been logged by the mobile electronic device. For example, the data may come from GPS, Wi-Fi networks, cell phone triangulation, sensor networks, other indoor or outdoor positioning technologies, sensors in the device itself or embedded in a user's body or belongings, and geo-tagged contents such as photos and text.

For example, for location data from GPS, each location reading includes a time stamp, location source, latitude, longitude, altitude, accuracy estimation, bearing and speed. Each sensor reading includes a time stamp, type of sensor, and values.

The frequency of location and sensor readings depends on how the user is tracked (e.g., continuously-tracked, session-based).

1.2 User Data Acquisition

Data may be acquired from the user through various methods. In one embodiment, there are two user data acquisition methods. The first is by continuously tracking users whom have a tracking application installed and running at all times. For these users, locations are logged with a low frequency to conserve battery life, such as once per minute.

The second method is session-based whereby users are indirectly tracked through third-parties. When to start and end tracking is controlled by the third-party application or device. When a tracking session begins, a user location is logged with a high frequency, to compensate for potentially short usage time. As an example, table 1 provides example input data to the inference pipeline, such as location readings.

Table 1 shows accuracy values which are sometimes available from location providers. For example, a device with the Android operating system produces accuracy estimations in meters for GPS, WiFi, and cell-tower triangulated locations. For GPS, accuracy estimations can be within 50 meters while cell-phone tower triangulations have accuracy estimations within 1500 meters. In the example shown in Table 1, the higher the accuracy value, the less accurate the reading.

TABLE 1

| Time | Latitude | Longitude | Altitude | Accuracy |
|---|---|---|---|---|
| Fri, 22 Jul. 2011 01:39:18 GMT | −28.167926 | 153.528904 | 48.599998 | 19 |
| Fri, 22 Jul. 2011 01:39:19 GMT | −28.167920 | 153.528890 | 45.700001 | 17 |
| Fri, 22 Jul. 2011 01:39:20 GMT | −28.167922 | 153.528866 | 47.700001 | 15 |

1.3 Output

The output of the inference pipeline is a list of places that the user is predicted to have visited. Each predicted place includes place name, place address, start time of the visit and end time of the visit. The inference pipeline system includes maintaining a place database as will be discussed herein. Thus, each prediction also has an identifier to the place entry in the database so that other information about the place is accessible. As an example, Table 2 provides example output data from the inference pipeline, such as place predictions.

TABLE 2

| From | To | Place |
|---|---|---|
| Mon, 7 Nov. 2011 19:18:32 GMT | Mon, 7 Nov. 2011 20:02:21 GMT | Valley Curls |
| Mon, 7 Nov. 2011 20:17:24 GMT | Mon, 7 Nov. 2011 20:24:11 GMT | Mesquite City Hall |

2. WORKFLOW

Figure 2:
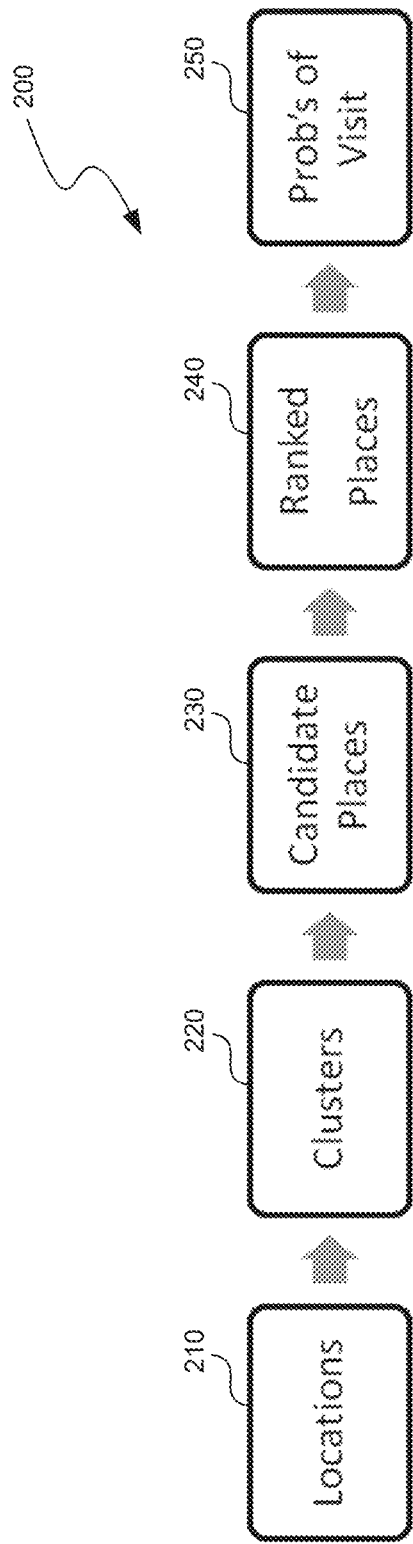
FIG. 2 depicts a high-level view of the workflow of the inference pipeline.

FIG. 2 is a high-level view 200 of the workflow of the inference pipeline. The pipeline takes raw location and sensor readings as input and generates probabilities that a user has visited a place.

For each data acquisition mode (i.e., continuously-tracked, and session-based), different techniques are used to predict the location of the user. This section focuses on the first type, continuously tracked users. The other type, session users, will be discussed later.

First the location readings, ordered by time stamp, are passed to a temporal clustering algorithm that produces a list of location clusters. Each cluster consists of a number of location readings that are chronologically continuous and geographically close to each other. The existence of a cluster indicates that the user was relatively stationary during a certain period of time. For example, if a user stopped by a Shell gas station from 8:30 AM to 8:40 AM, drove to a Starbucks coffee at 9:00 AM, and left the coffee shop at 9:20 AM, ideally two clusters should be generated from the location readings in this time period. The first cluster is made up of a number of location readings between 8:30 AM and 8:40 AM, and those locations should be very close to the actual location of the gas station. The second cluster is made up of a number of location readings between 9:00 AM and 9:20 AM, and those locations should be very close to the coffee shop. Any location readings between 8:40 AM and 9:00 AM are not used for inference. Each cluster has a centroid that the system computes by combining the locations of this cluster. A cluster can be further segmented into a number of sub-clusters, each with a centroid that is called a sub-centroid.

After a cluster is identified from a user's location readings, the place database is queried for places nearby the cluster's centroid. This search uses a large radius in hope to mitigate the noise in location data and cover all the candidate places the user may be located. A feature generation process examines each candidate place and extracts features that characterize the place. The inference model takes the features of each candidate place and generates the probabilities of each candidate being the correct place.

To tune this inference model, a "ground truth," or process to confirm or more accurately determine place location, is created that includes multiple mappings from location readings to places. A machine learning module uses this ground truth as training and testing data set to fine tune the model.

3. PROCESS

Figure 3:
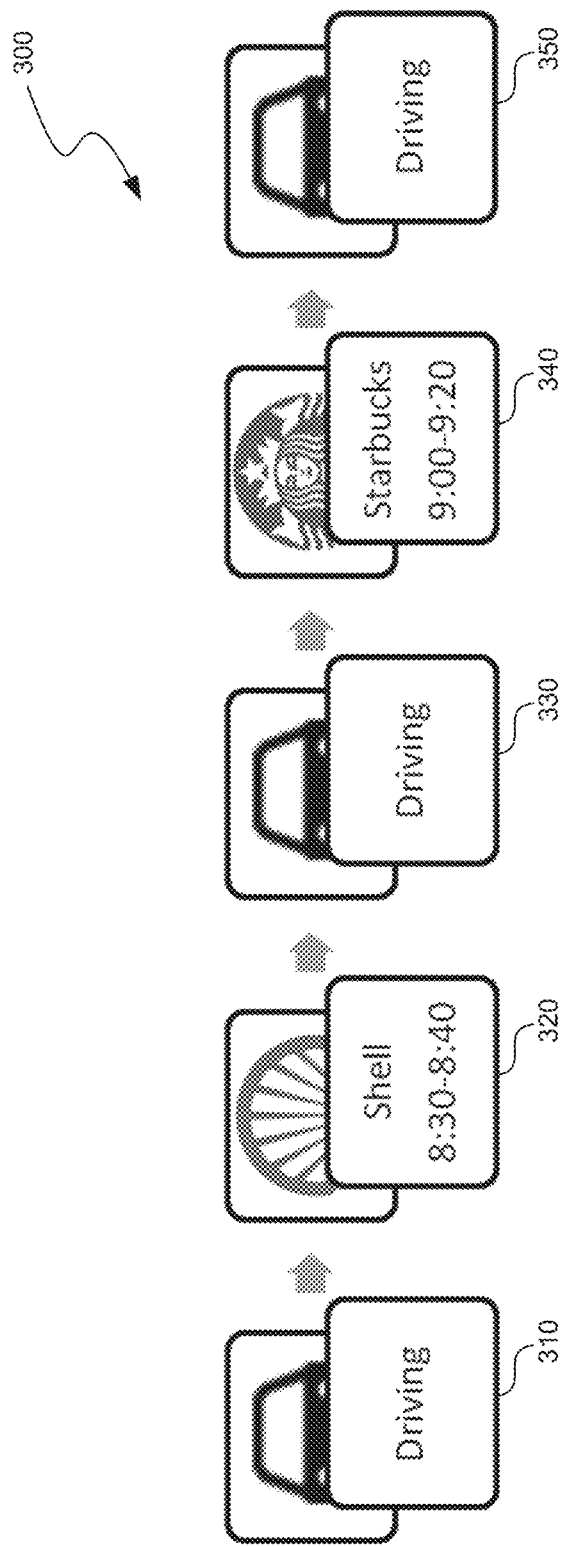
FIG. 3 illustrates an example path of a user and the subsequent data that can be derived and analyzed by the inference pipeline system.
Figure 4:
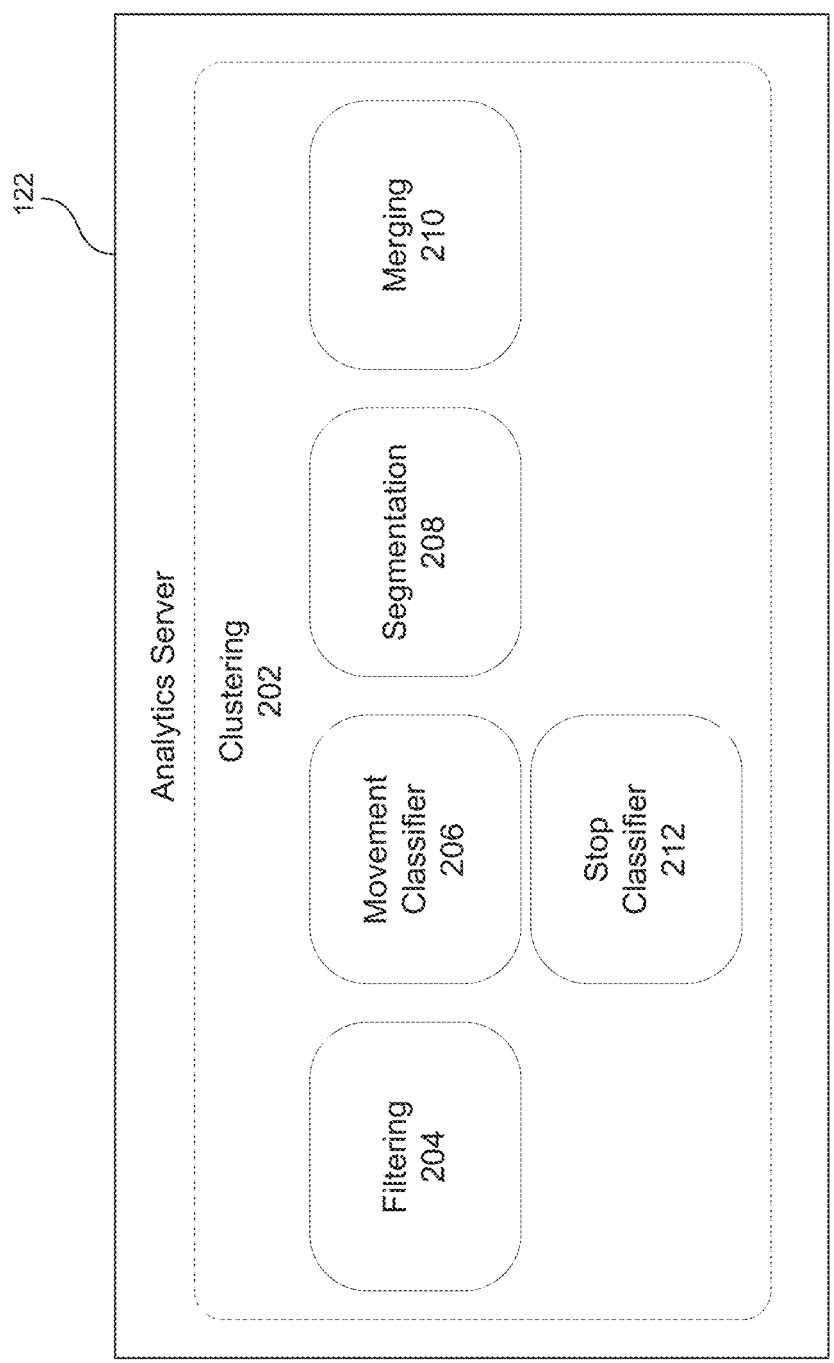
FIG. 4 depicts a block diagram of example components in an embodiment of the analytics server of the inference pipeline system.

FIG. 4 depicts a block diagram of example components or modules in an embodiment of the analytics server 122 of the inference pipeline. As shown in FIG. 4, the analytics server 122 of the inference pipeline can include, but is not limited to, a clustering and analysis component 202, a filtering component, 204, a movement classifier component 206, segmentation component 208, a merging component 210, and a stop classifier component 212. (Use of the term "system" herein may refer to some or all of the elements of FIG. 3, or other aspects of the inference pipeline system 120.) The following describes details of each individual component.

The functional units described in this specification may be called components or modules, in order to more particularly emphasize their implementation independence. The components/modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

3.1 Clustering

The clustering and analysis module 202 takes raw location data and sensor data as input and detects when a user has visited a place, and how a user transitions from one place to another place. The clustering module may include three basic processes. First, raw location data pass through a filter to remove spiky location readings. Second, the stop and movement classifier identify user movement, and segmentation splits the location sequence into segments during which the user is believed to be stationary or stopped. Third, neighboring segments that are at the same location are merged to further reduce the effect of location noise.

3.1.1 Filtering

The filtering component 204 may filter two types of location readings: location readings with low accuracies and noisy location readings.

The first type, location readings with low accuracies, can include location data from cell tower triangulation, which may be filtered out. Any other location data with estimated accuracy worse than a threshold can be filtered out too. This accuracy estimation is reported by the mobile electronic device. As described above, accuracy estimations are measured in meters and a reasonable threshold would be 50 meters.

The second type, noisy location readings, can be locations without explicitly low accuracy estimations, but have specific attributes (e.g., unreliable, erratic, etc.). To capture spiky locations, a window size may be used to measure the deviation of a location reading. A predetermined number of location readings immediately preceding the location in question, and a predetermined number of location readings immediately after, are used to compute the average location of a neighborhood (e.g., two readings before and after). If the distance between location in question and the neighborhood average is greater than a threshold, the location in question is removed. In this case, the threshold can be different from the threshold for accuracy estimations and is used to prevent spiky location readings that are reported to be highly accurate. As an example, a WiFi location may have a high accuracy value (e.g., low number in meters), but in fact be pinpointing a place in a different country.

Figure 5A:
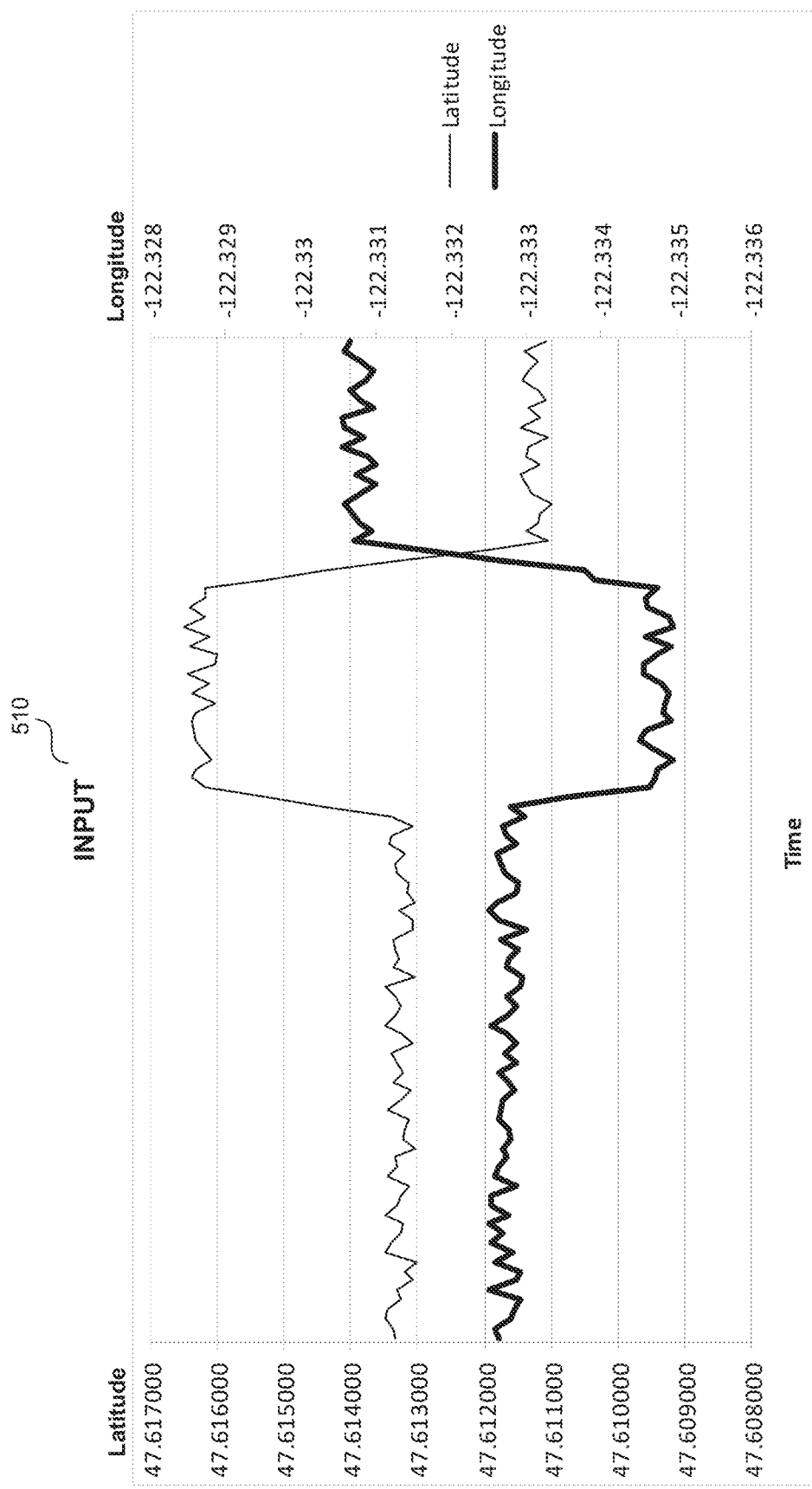
FIGS. 5A and 5B depict example inputs and outputs to a clustering algorithm.
Figure 5B:
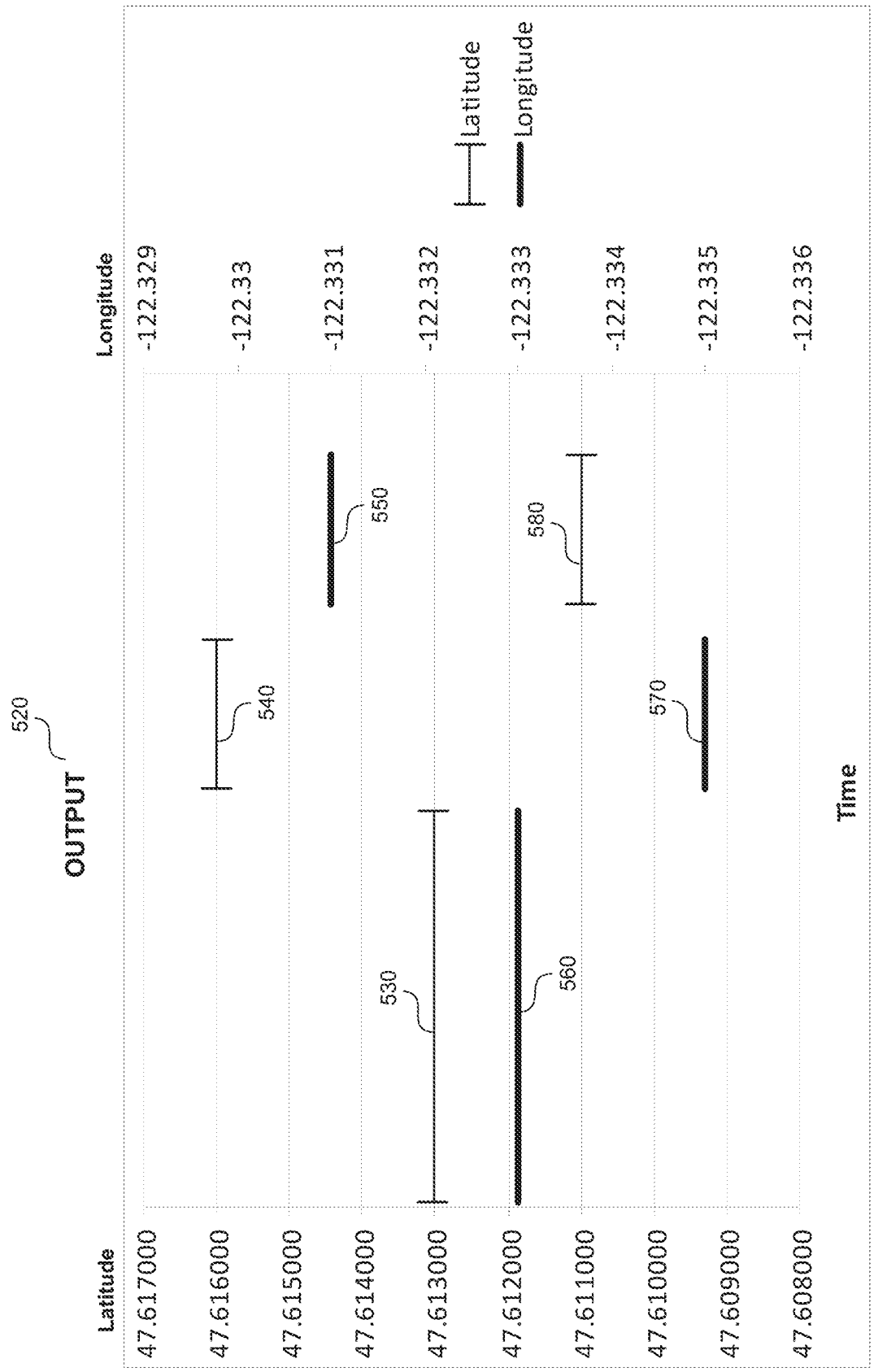

FIGS. 5A and 5B illustrate example inputs and outputs of a clustering 202 module or process. FIG. 5A shows the various location readings while FIG. 5B shows the final results of the clustering module 202. X-axis is time, while y-axes are latitude and longitude. The input is a sequence of location readings that can be very noisy. After running the clustering module, three clusters are identified from the straight lines shown in FIG. 5B, with centroids at coordinates <47.613, −122.333>, <47.616, −122.355>, and <47.611, −122.331> respectively. Although FIGS. 5A and 5B only show latitude and longitude, altitude and sensor data may also be taken into account in the clustering module.

3.1.2 Movement Classifier

The movement classifier component 206 can detect movement in at least two ways under the clustering module 202.

3.1.2.1 Location Trace Based

Under location trace based methods, the movement classifier component 206 uses a sliding time window that moves along a location sequence. For each window, the movement classifier component determines whether the user moved during this period. If the movement classifier component determines that the user has likely moved, the classifier splits the location sequence at the point in the window where the user speed is greatest.

FIG. 6 illustrates this location trace based method 600 of detecting movement. As illustrated in FIG. 6, each block in the five rows represents a location reading. The second and third windows 620 and 630 are classified as moving and the other windows 640, 650, 660 are classified as not moving. As the result, the location sequence is broken into two segments as shown by the row 670.

The sliding window in the example of FIG. 6 has a size of six readings. The movement classifier uses this window of six readings to determine if the user was moving. First the diameter of the bounding box of this window is computed using the minimum and maximum of latitude and longitude.

diameter=$D$(<latitude$_{min}$, longitude$_{min}$>,<latitude$_{max}$,longitude$_{max}$>)

where D is the great-circle distance between two locations on Earth.

Additionally, the speed of this window, defined below, is also computed $$\text{speed} = \frac{\text{diameter}}{\text{duration}}$$

where duration is the length of the sliding window.

If the diameter is greater than a threshold, such as 100 meters, or if the speed is greater than a threshold (such as one meter per second), the classifier outputs true (moving); otherwise it outputs false (not moving).

3.1.2.2 Sensor Based Method

The other method uses sensors in the tracking device to detect if a user is moving. When accelerometer data is available, the movement classifier uses a similar sliding window and applies a Fourier transform to the sensor data (e.g., accelerometer data) to calculate the base frequency of user movement in each time window. Depending on this frequency, a user's movement is classified as moving or stationary.

3.1.3 Splitting Location Sequence

If the movement classifier classifies a window as moving, the classifier identifies a point of maximal speed and splits the location sequence at that point.

If the window is classified as not moving, the sliding window shifts one location reading towards the future, and the process repeats.

3.1.4 Segmentation and Centroid Computation

After the sliding window has covered all the locations of a user, the segmentation component 208 divides the whole location sequence into one or more segments. Each segment is called a location cluster. The segmentation component then calculates the centroid of a location cluster by combining the locations in this cluster.

$$\text{latitude}^* = \frac{1}{N}\sum_{i=1}^{N} w_i \text{latitude}_i$$

$$\text{longitude}^* = \frac{1}{N}\sum_{i=1}^{N} w_i \text{longitude}_i$$

where $w_i$ is the weight for the $i^{th}$ location. The weighted value depends on the source of the location. As an example, GPS locations have higher weights than other locations. In another implementation, an internet search engine may be weighted higher than a restaurant recommendation service.

3.1.5 Merging

It is possible an actual cluster is broken into several clusters, because of noisy location data. An extra step is taken or a process implemented to merge consecutive clusters if their centroids are close. The merging component 210 handles such merging. One condition, implemented by the merging component, for two neighboring clusters to merge is when the distance is below a threshold, and the start time of the later cluster is no later than a few minutes after the end of the earlier cluster.

3.1.6 Stop Classifier

The stop classifier component 212 examines the duration of each cluster, and decides if the cluster represents a user staying at a place. If the duration does not fall into a predefined range, the cluster is filtered out and not considered for next stages. An example predefined range would be any time between two minutes and three hours.

3.2 Candidate Search

After clusters are generated under the clustering module 202, the system sends search requests or queries to a place database to retrieve places close to each cluster's centroid.

The place database contains information for all the places that have been collected by the analytics server. The information includes name, address, location, category, business hours, reviews, and parcel geometries. The place database is geospatially indexed so that a search by location can be quickly performed. All places that are within a radius from the cluster centroid are returned as candidate places.

Place data is generated from multiple sources, including by not limited to, geographic information databases, government databases, review Web sites, social networks, and online maps. Places from multiple sources may be matched and merged, creating a richer representation of each physical place. By combining information from multiple sources, one can minimize noise and improve data quality. For example, averaging locations of the same place from all sources, and giving higher weights to more reliable sources can improve the estimation of the actual location of the place. The actual location of each place is provided by a place location ground truth (described later).

3.3 Feature Generation

For each cluster, the analytics server of the inference pipeline takes all of the place candidates found from the place database and ranks them by the probability that a typical user, or this particular user, would visit. Before that, features are extracted from each candidate.

Three types of features can be extracted from each place candidate:
1. Cluster features are only dependent on the cluster itself, not any place candidates. A cluster feature has the same value for all the candidates of a cluster.
2. Place features are place specific features. Each candidate may have different place features depending on their attributes such as locations and categories.
3. User features which depend on the user's profile such as demographic attributes. Similar to cluster features, user features are the same for all the candidates of a cluster.

3.3.1 Cluster Features

Cluster features describe properties of the cluster and can include:
- Duration of the cluster
- Noisiness of location readings in the cluster, measured as the average accuracy
- Number of location readings in the cluster
- Radius of the cluster
- Probability of visiting different categories of places given the timestamp for the cluster or "cluster time"
- Density of places near the cluster centroid
- Zoning information of the cluster centroid
- Season, weather, or temperature associated with the cluster time

3.3.2 Place Features

Place features describe properties of a place candidate. Place features include
- Distance to cluster centroid
- Number of sources: The place database collects place information from a number of reverse geo-coding sources. This feature counts how many data sources provides the place
- Low quality place location: Some data sources have low accuracy place locations. This feature examines if a place candidate only comes from individual or lower accuracy data sources.
- Popularity: Popularity of a place can be calculated from number of times users check in to a place, number of people who connected to a place on social networks, number of comments or reviews, Wi-Fi/Bluetooth signal visibility to users' mobile electronic device, noise level, transaction volumes, sales numbers, and user visits captured by other sensors.
- Category: If the category taxonomy is a multi-level hierarchy, more than one features can be used
- Single user place: This feature is defined as whether a place has small number of users who ever checked in or otherwise visited this location.
- Review count: For places that come from data sources with reviews, this feature is the total number of reviews
- Time-category match: This feature measures the probability of a user visiting a place of a particular category, given the day or time of day. For example, at 7 AM, a user is more likely to visit a coffee shop than a night club
- Business hours: Probability the place is open at the time of the visit.
- Parcel distance: The distance between the centroid of the parcel and the centroid of the cluster
- Cluster in place parcel: This feature is true when the centroid of the cluster falls into the parcel of the place

3.3.3 User Features

User features are generated from user profile, including demographics, mobile device information, user location history and other information that helps predict where a user is visiting. Past place visits are also useful in predicting future visits. For example, if high-confidence inferences have been made in the past that a user visited a certain neighborhood grocery store every week, the user is more likely to go to this place if he/she hasn't been there for seven days.

- User demographics, including age, gender, income level, ethnicity, education, marital status, and number of children
- Distance to home location
- Distance to work location
- Commute patterns
- Device features including manufacturer, model, service provider, and sensor availability.
- Frequently visited places in the past.

3.4 Inference Engine

All the features are combined as a composite feature vector and normalized to the range of zero to one. For each cluster, the inference engine examines the feature vectors of each candidate place and ranks them by the probability of being the actual place.

3.4.1 Ranking Candidates

The inference engine may use a mapping from a feature vector F to a ranking score s, such as via a linear model:

$$s = W^T F - b$$
$$= \sum_{i=1}^{M} W_i F_i - b$$

where W is the weight vector, b is the bias value, and M is the total number of candidates. The higher this ranking score, the more likely the candidate is the actually place. The weight vector is determined by the training process.

3.4.2 Probability Estimation

The inference engine then turns the score into a probability $$\phi = e^s$$
$$P(Place_j) = \frac{\phi_j}{\sum_{k=1}^{n} \phi_k}$$

With this probability, one can either take the candidate with the highest probability as the inference output, or use a list of top candidates, along with their probabilities, as the result.

3.5 Ground Truth Generation

In order to verify inference models, the system collects ground truth data. This data is considered to be accurate observations that link a user with a place at an instance of time. This data is used to train and validate the inference models downstream. Some sources of reference data include, but are not limited to, the following:

3.5.1 Place Location

Ground truth for place locations is collected by having human labelers associate places with locations on mapping tools. Each location is then converted to a latitude-longitude coordinate and stored in a database. The labelers may be tasked with identifying the place in question on an aerial map and writing down the coordinates of the center of the building and the geometry of the building. If there is more than one place sharing the same building, the best estimation of the correct corner is taken.

3.5.2 Place Confirmation

This is a place where a user checks in or confirms as the actual place associated with his or her location. If a place is not listed, the user has the ability to manually add the name of the place. A place confirmation includes data sources such as a voluntary check-in, or from sensor measurements of temperature, sound, light, proximity sensors, or near field communication (NFC) chipsets, etc.

Place confirmations are determined with a separate tool that collects ground truth data. An example of such tool is a mobile application that suggests a list of places to check-in to, given the user's location. Every time a user checks-in to a place, this is logged as a check-in observation event. When the check-in is registered, the check-in observation event is associated with a latitude and longitude and timestamp. This source of data serves as a direct validation of inference model and is used to train the model.

3.5.3 Offline Check-In

Users can check in to a place via third party location-based services. When a user registers a check-in, the analytics server requests check-in information logged by the user within that service. These check-ins are transmitted as offline check-ins. This source of data serves as reference data for the inference pipeline. By combining mobile device data and user check-in created using third-party software, the analytics server can map a user's device data to places.

3.5.4 Place Queries

A check-in service includes social networking websites that allow users to "check in" to a physical place and share their location with other members. Examples of check-in services include Facebook, Foursquare, Google Latitude, and Gowalla. Check-in services provide a list of nearby places and allow an opportunity for the user to confirm a place s/he has visited. The place data can then be stored with the check-in service provider in order to support personal analytics, sharing on social networks, earning incentives, public and private recognition, general measurement, broadcasting, and history. Every time a user queries check-in services for nearby places, the data is packaged into an observation that is sent to the analytics servers. A place query contains a time stamp, user location, and places received from each check-in service. This data helps to preserve and recover original user check-in experience for verification purpose.

3.5.5 Place Survey Answers

This is obtained from sources that include but is not limited to responses to survey questions relating to places visited by a user. Survey questions are generated by the inference pipeline and serve as a form of feedback mechanism. In one implementation, survey questions are generated automatically. After the inference pipeline predicts a user's visits within a certain time window, an algorithm evaluates the uncertainty of each inferred visit and picks highly-uncertain instances to generate survey questions. Questions are generated using various rules to improve the accuracy of an inference, and eliminate results that are highly ambiguous or have a low confidence. In turn, uncertain inferences are used to generate survey questions because the inferences tend to have low accuracies and thus, any validation of such inferences helps improve the inference engine. An example presentation of survey questions is "Were you at one of the following places around 4 PM yesterday?"

A. Starbucks Coffee
   B. McDonald's
   C. Wal-Mart
   D. None of the above

Answers to Survey Questions are used as training data to fine-tune the inference model, and improve the chance that the correct place is ranked as top candidate. User data from mobile devices and survey question answers are paired up to create training samples, and input to machine learning algorithm to adjust the inference model.

To detect fraud and estimate data quality, random places are included in survey questions. In one implementation, a place that is not in the vicinity of the user is added to the choices. If this place is picked, the survey question is marked as invalid. Statistics associated with fraudulent answers are used to determine the reliability of survey answers. Also, the order of answers is randomized to remove position bias.

3.5.6 Activity Journal

By combining a digital journal with a mobile device, a user can be associated with a verified location in order to produce validated place data. The device registers observations that include location data, and the digital journal enables an individual to log actual place and time data. The digital journal which includes place and time data is combined with device observation using time stamp as the "join point." A join point can use time to correlate digital log data with device observation data. This joining of two sources of data generates reference data for the inference pipeline. For example, when a user enter information into a digital log that he was at a coffee shop at 9 AM, and when there is observation data collected at 9 AM, a join point is created for 9 AM that associates the device observations with a location of the user (i.e., coffee shop).

Journals are tabular data in any form, such as a spreadsheet or digitized paper form. Processing journals can either be a manual or automatic process. Journals can be turned into any format, such as text files or a database, as long as it can be processed by the inference pipeline.

Reference data is considered highly accurate and is designed to generate pinpoint accuracy in terms of location, place, time, and activity.

TABLE 3

| Place Name | Mall/Area | Date | Walk-in Time | Leave Time | Entry/Exit | Path to Place | Actions at Place | Notes/Issues |
|---|---|---|---|---|---|---|---|---|
| General Store | Main St | Nov. 8, 2011 | 11:52 am | 12:01 pm | South Door | Took sidewalk from parking lot | Stood near entrance | NA |

Table 3 provides example fields in the digital log completed by a journal-taker. The journal-taker completes each of the columns confirming the place name of a visit records any optional notes or issues. The time stamp can be automatically filled-in or manually entered. The values in these fields assign information to device observation data. The level of precision and accuracy is considered high based on the details collected by the digital logs. This data is considered high value across reference data sources.

3.5.7 Third-Party Reference Data

Data can be bulk imported into the system from third-party feeds that include questionnaires, travel logs, credit card purchase logs, mobile wallet transactions, point-of-sale (POS) transactions, bar code scanning, security card or electronic access data (e.g., access to buildings, garages, etc. using security cards/PIN codes), etc. The inference pipeline infrastructure provides interfaces to bulk import data that can augment the database with reference data.

3.5.7.1 User-Generated Contents

Validation data can be generated by associating data collected on mobile devices with user-generated contents on social networks, review sites and other types of information sharing platforms. For example, a social network post about an event directly matches a place. Similarly, user's contacts on a social network may also be used as a source of ground truth to validate location data.

3.5.7.2 Purchase Records

Purchase information identifies a place where a purchase occurred, and a time when the purchase occurred. These values combined with location data act as a form of validation and can be treated as ground truth for the inference pipeline.

Without the location data, store activity can still be used in the inference pipeline to identify that the user has visited a place, and the frequency of purchases can determine frequency of visits. This store activity acts as a behavioral roadmap of past activity as it can be indicative of future behavior in the form of places visited.

3.5.7.3 Network Data

Network data includes a network of devices that register location data at various levels of precision. Sources of network data include mobile carriers, network service providers, device service providers and the data and metadata may be collected as a byproduct of core services.

As an example a mobile carrier provides cell phone service to millions of customers via their cellular network. This network is a byproduct of providing core cell service registers location data because the mobile device is connected to an access point. Aggregating this data across all customers creates a density map of carrier activity associated with location, which the data collection system defines as Network Data. This network data can act as a proxy of baseline location activity for millions of customers. In addition, the network data may help to identify popular sites or more trafficked areas so that more accurate predictions for a user's location can be made.

The network data acting as baseline location activity enables the data collection system to identify location biases and build models to normalize against those biases. As more sources of network data are incorporated, the models become more robust and diversified, as a single source may not accurately represent a population in a given geographic area.

Network information related to WiFi base stations, such as signal strengths, frequently-used WiFi networks, may be correlated with place confirmation data in order to build a history of check-in activity or empirical data. In this implementation, WiFi network features can be used as markers to identify a place. WiFi network features include aspects such as a network name (SSID), signal strength, MAC address, IP address, or security settings. Features generated from a device that is associated with a WiFi network include names of available WiFi networks, WiFi networks a device is connected to, and names of WiFi networks that are visible to the device—all of which provide additional information about a person's location in relation to a place. These features act as markers in the inference model to determine a place.

As an example if a device is constantly connected to a certain WiFi network name over the span of a few days from 7 pm to 7 am, this WiFi network may become a marker that signifies the home of the device owner. This concept of a continuous, recurring, and/or persistent WiFi network connection applies outside of home, including work and school.

As another example, networks named after networking devices, such as "linksys" or "NETGEAR," are more likely to be home networks than business networks. Also, a connection to a WiFi network is a strong indication that a person is located at or near a place that is frequently or commonly visited. This same logic is applied to identify businesses, where the network name might identify an actual business name providing the service (e.g., McDonald's WiFi, Starbucks, Barnes and Noble Customer WiFi, Best Western Inn Wireless).

4. IMPROVING INFERENCE MODEL WITH MACHINE LEARNING

As noted above, the inference engine may be validated with ground truth data that maps user locations to places.

4.1 Training Data

Training data contains a list of location records or labels that can be generated by users who carry the mobile electronic device with them in normal daily life. Each label consists of a timestamp, a reference to a place in the database, and the user ID. The users' mobile electronic devices are also tracking their locations. By looking up the user ID of each label, corresponding location readings can be retrieved. Using the retrieved location readings close to the label timestamp, one can go through the inference pipeline, starting from clustering, to predict the location of a user. The machine learning process uses the predicted place and actual place to tune the model.

Training data can come from either direct validation data, such as user check-in and survey questions, or indirect validation data, such as credit card transaction history. Indirect validation data can be used in the same way as direct validation data, to improve ranking of place candidates, and estimate the accuracy of an inference. Data collected on a user's mobile devices is fed to the model, and then the output of the inference model(s) is compared against the input data. Any disagreement between model output and desired result is sent back to the model to adjust parameters.

Each training sample consists of a feature vector and a label for every candidate place of a cluster. For a cluster with M candidate places, the label is represented as a probability $$P_y(x_j), j=1,\ldots,M$$

where x is the $j^{th}$ candidate. If $x_j^*$ is the correct place $$P_y(x_j) = \begin{cases} 1, & j = j^* \\ 0, & j \neq j^* \end{cases}$$

4.2 Loss Function

The loss function is defined as the cross entropy. If the output of the model is represented as $$P_{z(f_W)}(x_j)$$

where f is the model, and W is the model parameter (for example weight vector). The loss function is $$L(y, z(f_W)) = -\sum_{j=1}^{M} P_y(x_j) \log(P_{z(f_W)}(x_j))$$
$$= -\log(P_{z(f_W)}(x_{j^*}))$$

4.3 Optimization

Gradient descent is used to optimize the model. The gradient of the loss function is $$\Delta W = \frac{\partial L}{\partial W}$$
$$= \frac{\partial L(y, z(f_W))}{\partial W}$$
$$= -\frac{\partial \log(P_{z(f_W)}(x_{j^*}))}{\partial W}$$
$$= \frac{\partial f_W(x_{j^*})}{\partial W} + \frac{\sum_{k=1}^{M} \exp\left(f_W(x_k) \frac{\partial f_W(x_k)}{\partial W}\right)}{\sum_{k=1}^{M} \exp(f_W(x_k))}$$

Since $\phi_k = \exp(s_k)$ and $s_k = f_W(x_k)$ $$\Delta W = -\frac{\partial s_{j^*}}{\partial W} + \frac{1}{\sum_{k=1}^{M} \phi_k} \sum_{k=1}^{M} \left(\phi_k \frac{\partial s_k}{\partial W}\right)$$

More specifically $$\Delta W_l = -F_{j^*,l} + \frac{1}{\sum_{k=1}^{N} \phi_k} \sum_{k=1}^{M} (\phi_k F_{k,l})$$

where $F_{k,l}^{(i)}$ is feature l of place candidate k in instance i.
The weight vector is update with this gradient $$W_l^{t+1} = W_l^t + \eta \Delta W_l^t$$

where $\eta$ is the learning. Learning stops when the results converge.

4.4 Accuracy Estimation

Some clusters are harder for the inference engine to predict than other clusters because of a number of factors, such as location accuracy, the number of candidate places close to the cluster, and availability of certain place attributes. A classifier is trained to estimate of the accuracy of each inference result. This estimated accuracy is used when aggregating inference results. For example, one can apply different weights based on the estimated probability of each inference being correct.

The accuracy estimation classifier takes several features as input including the average precision of locations in the cluster, the number of place candidates nearby, whether the location is inside an indoor mall, and whether the location is close to high rise buildings or in a more remote area.

This classifier is trained against validation data. This classifier does not impact the results of the inference engine, but it assigns a confidence value to each inference instance. This value is used to weight the impact of each inference when aggregating results. Inferences with lower confidence values are weighted lower than those with higher confidence values so that the overall result is more accurate.

5. INFERENCE WITH SESSION USERS

As discussed earlier, there are two modes of data acquisition or location input: continuously-tracked and session-based. What has been described previously includes a continuously-tracked mode of data acquisition. Session-based data acquisition mode is different in at least three aspects.
1. User locations for session users are segmented, whereas user locations for continuously-tracked users are non-stop. Location tracking is controlled by third-party applications or devices which integrate e.g., analytics agent. User locations are only available when a tracking session is turned on. The result is that the analytics server only receives location data during the sessions, which are typically short.
2. User location data is collected at a higher frequency because battery life is less of a concern when tracking is limited to short periods of time, locations are logged with higher frequency, typically once per second. The model will have a better estimation of user movement.
3. All sensors are turned on when tracking starts, including accelerometer, orientation, and gyroscope when available.

The difference between session-based location input and continuously tracked location input is addressed by modifying the inference pipeline in the following ways.

5.1 Movement Detection

When user speed is higher than a threshold, the system may skip the session and not run the inference engine. Speed is computed by dividing the diameter of the location bounding box by the length of the session.

5.2 Skip Clustering

When the user is detected to be stationary, the system may skip clustering. The entire session is considered as a cluster. The centroid of the cluster is computed the same way as a cluster in continuous tracking mode.

5.3 Additional Features

Because session users tend to have denser location readings and sensor readings, several features are added to the inference model to take advantage of additional data:
  Application type data identifies the kind of application/device that is tracking the user
  Orientation data of the mobile electronic device
  Base frequency of the mobile electronic device's movement. A base frequency is computed from a Fourier transform of the accelerometer readings, and can be generated from historical data, such as using samples gathered over a day, week, month, or other timeframe. The base frequency can measure how fast a body oscillates. For example, a jogger's base frequency can be 3 Hz, while a walker's base frequency can be 1.5 Hz.

6. AGGREGATION OF INFERENCE RESULTS

After collecting information from a user's mobile device for a period of time, and running the inference engine on the data, the results can be aggregated in different ways to serve different purposes.

6.1 Personal Location Profile

By aggregating a single user's place visit data, one can generate a user location profile with the user's consent which presents useful information about the user's behavior and visit patterns. Such information may include statistics about the user's daily commute, frequently visited places, vehicle's fuel economy, and other personal location analytics data. From this data, one can propose alternative routes, offer incentives to nearby businesses, and suggest similar places frequented by the user in the same area.

Figure 7:
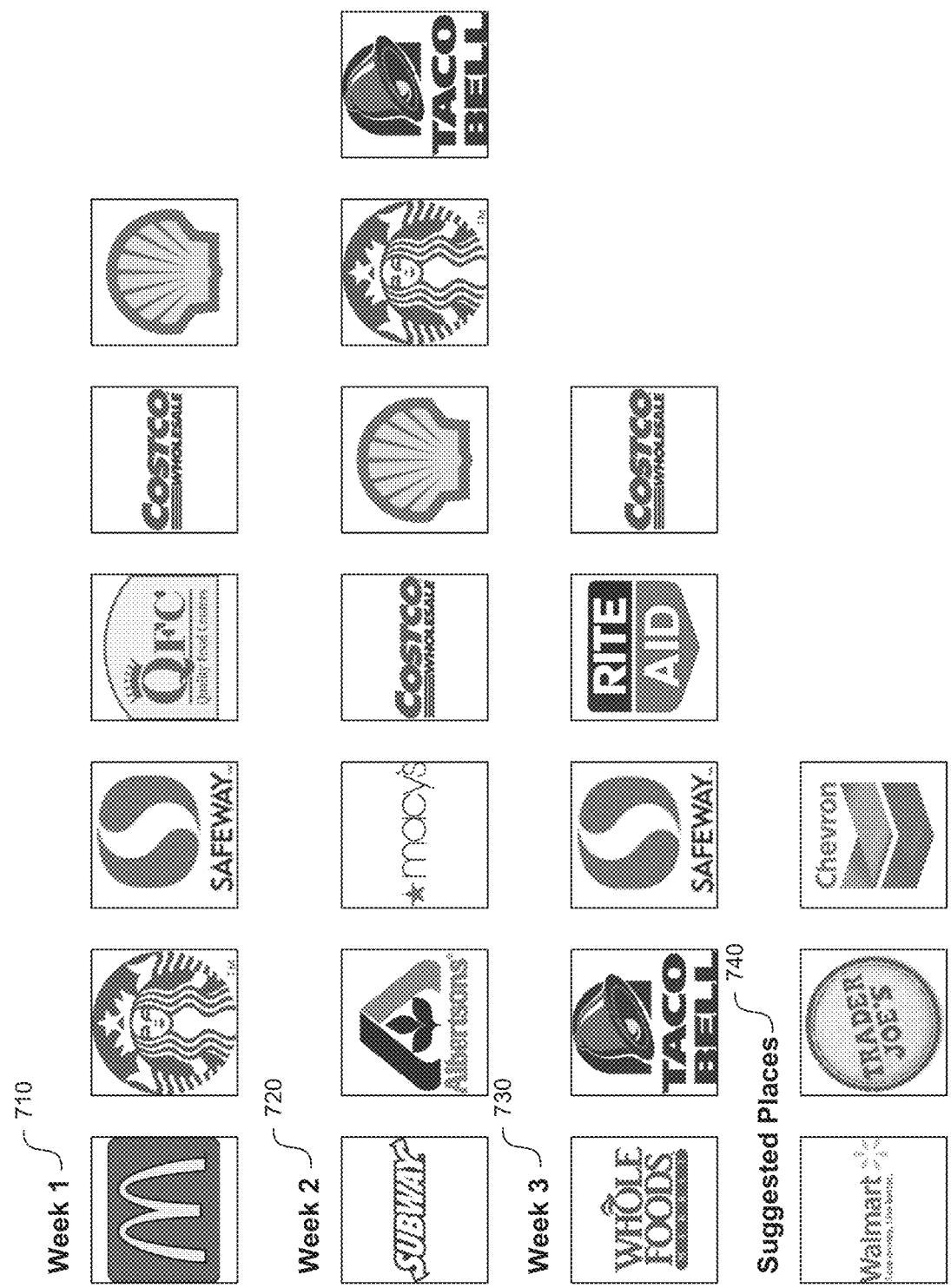
FIG. 7 depicts an example presentation of a personal location profile.

FIG. 7 illustrates an example presentation of a personal location profile, which shows places visited on a weekly basis, and suggests related places. While not shown in FIG. 7, timing information or timestamps are associated with inference results to infer activities such as lunch, activities after work hours, commuting, etc. As an example, week one 710 shows a visit to McDonald's and Starbucks during lunch for a certain amount of time (e.g., an hour and a half), spending an hour each at Safeway, QFC, and Costco for groceries after work, and finally refilling on gas at a Shell before returning home. Week 2's 720 visits to Subway, Albertsons, Macy's, Costco, Shell, Starbucks, and Taco Bell and Week 3's 730 visits to Whole Foods Market, Taco Bell, Safeway, Rite Aid and Costco can also reveal similar information such as visit duration, time of visit, venue address, proximity, etc. As a result of the user's personal location profile, the system can arrive at some suggested places 740 including Wal-Mart, Trader Joe's, and Chevron.

6.2 User Location Analytics

By aggregating data of places visited across multiple users, one can produce user location analytics for third-party mobile application developers. Such analytics report may display, among others, how often users consume a mobile application at home, at work and during commute, geographical distribution of user base, user activities before, during, and after consuming the application.

7. CONCLUSION

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. A method for inferring a location of a user, the method comprising:
   receiving raw location data from a mobile device associated with a user;
   filtering the raw location data to generate filtered location data, wherein filtering the raw location data comprises:
      filtering low accuracy location data from the raw location data, wherein the low accuracy location data is identified based upon an accuracy estimate associated with one or more portions of the raw location data with respect to an indicated location, the accuracy estimate reported by the mobile device, and wherein the low accuracy location data is filtered based upon a first threshold; and
      filtering noisy location data from the raw location data, wherein noisy location data is location data estimated as accurate but has a distance greater than a second threshold from an average location, the average location determined based upon a predetermined number of locations readings preceding the noisy location data and a predetermined number of location readings after the noisy location data;
   identifying, from the filtered location data, a stationary location of the mobile device, wherein the stationary location is associated with the mobile device being stationary for longer than a threshold time;
   determining multiple candidate place names that are within a predetermined radius of the stationary location, wherein determining multiple candidate place names that are within a predetermined radius of the stationary location includes querying a place name database that includes place information and corresponding geo-location data;
   obtaining attributes of the filtered location data and attributes of the multiple candidate place names;
   extracting, for each candidate place name, place features based upon attributes for an individual place name;
   extracting cluster features describing cluster properties, wherein the cluster features comprise radius of the cluster, number of location readings within the cluster, and noisiness of location readings in the cluster, and wherein the cluster features are applicable to the multiple candidate place names located within the cluster;
   extracting user features from a profile associated with the user;
   generating a composite feature vector based upon the place features comprising the place features describing a candidate place, the cluster features, and the user features describing the user, the user features comprising demographic attributes; and
   inferring, based upon the composite feature vector, one of the multiple candidate place names as a place name for the stationary location based on a comparison of the attributes.

2. The method of claim 1, wherein the raw location data comprises a series of location data, the method further comprising:
   classifying a sliding window of N contiguous location data over the series of location data as moving or not moving, wherein N is an integer number of location data;
   segmenting the series of location data into two or more location clusters based on whether the sliding window is classified as moving or not moving; and
   identifying a place name for each of the two or more location clusters.

3. The method of claim 1, further comprising:
   receiving reference data associated with the user that links the user to a candidate place at an instance of time;
   wherein inferring one of the multiple candidate place names as a place name for the stationary location includes inferring one of the multiple candidate place names based on the received reference data.

4. The method of claim 1, wherein the raw location data includes latitude and longitude coordinate data and an associated time at which the data was measured.

5. The method of claim 1, wherein the raw location data is received based on continuous tracking of the user.

6. The method of claim 1, wherein the raw location data is received during session-based tracking of the user.

7. A system for inferring a location of a user, the system comprising:
   at least one processor; and
   memory storing executable instructions that, when executed by the at least one processor, performs a method comprising:
      receiving multiple location readings, wherein each location reading is associated with a time and estimated accuracy;
      filtering the multiple location readings to generate filtered location readings, wherein filtering the multiple location readings comprises:
         filtering low accuracy location data from the multiple location readings, wherein the low accuracy location data is identified based upon an accuracy estimate associated with one or more portions of the multiple location readings, the accuracy estimate reported by the mobile device, and wherein the low accuracy location data is filtered based upon a first threshold; and
         filtering noisy location readings from the multiple location readings, wherein a noisy location reading is a location reading estimated as accurate but has a distance greater than a second threshold from an average location, the average location determined based upon a predetermined number of locations readings preceding the noisy location data and a predetermined number of location readings after the noisy location data;
      determining a stop for the mobile device based on the filtered location readings, wherein the stop includes a stop time and a stop location;
      predicting a plurality of possible places associated with the determined stop location at the determined stop time;

extracting an attribute of each of the possible places, wherein the attribute includes at least one of a place category or hours of operation;

extracting, for each possible place, place features based upon attributes for an individual place name;

extracting cluster features describing cluster properties, wherein the cluster features comprise radius of the cluster, number of location readings within the cluster, and noisiness of location readings in the cluster, and wherein the cluster features are applicable to the plurality of possible places located within the cluster;

extracting user features from a profile associated with the user;

generating a composite feature vector based upon the place features comprising the place features describing a candidate place, the cluster features, and the user features describing the user, the user features comprising demographic attributes; and inferring, based upon the composite feature vector, one of the multiple candidate place names as a place name for the stationary location based on a comparison of the attributes.

8. The system of claim 7, wherein the stop is determined by determining the time and location of the mobile device by clustering the filtered location readings into location clusters.

9. The system of claim 7, wherein the stop is determined by determining the time and location of the mobile device by clustering the filtered location readings into location clusters; and wherein the method further comprises merging neighboring location clusters when a centroid of each of the neighboring location clusters is below a centroid threshold.

10. The system of claim 7, wherein the stop is determined by determining the time and location of the mobile device by clustering the filtered location readings into location clusters; and wherein the method further comprises querying a place database to retrieve the possible places that are within a radius from a centroid of each of the location clusters;

wherein the place database stores locations and attributes corresponding to places.

11. The system of claim 7, wherein the method further comprises calculating a probability that the user is located at each of the possible places, wherein the probability is based on a distance between reference data and each of the possible places and the extracted attribute.

12. The system of claim 11, wherein the reference data links the user to a candidate place at an instance of time, and wherein the reference data is derived from at least one of: place check-in, internet search activity, social networking site activity, geotagged image, email, phone call, calendar appointment or network activity.

13. The system of claim 7, wherein the stop is determined by determining the time and location of the mobile device by clustering the filtered location readings into location clusters;

wherein the method further comprises computing a centroid of each of the location clusters as a weighted combination of location readings associated with the location cluster, wherein a weight of a location reading depends on the source of the location reading.

\* \* \* \* \*